United States Patent
Raskar et al.

(10) Patent No.: US 9,148,649 B2
(45) Date of Patent: Sep. 29, 2015

(54) METHODS AND APPARATUS FOR IMAGING OF OCCLUDED OBJECTS FROM SCATTERED LIGHT

(71) Applicants: Ramesh Raskar, Cambridge, MA (US); Andreas Velten, Madison, WI (US)

(72) Inventors: Ramesh Raskar, Cambridge, MA (US); Andreas Velten, Madison, WI (US)

(73) Assignee: Massachusetts Institute of Technology, Cambridge, MA (US)

( * ) Notice: Subject to any disclaimer, the term of this patent is extended or adjusted under 35 U.S.C. 154(b) by 576 days.

(21) Appl. No.: 13/646,703

(22) Filed: Oct. 7, 2012

(65) Prior Publication Data

US 2013/0100250 A1 Apr. 25, 2013

Related U.S. Application Data

(60) Provisional application No. 61/544,780, filed on Oct. 7, 2011.

(51) Int. Cl.
| | |
|---|---|
| *H04N 13/02* | (2006.01) |
| *G01S 17/89* | (2006.01) |
| *G01S 7/48* | (2006.01) |
| *G01S 7/484* | (2006.01) |
| *G01S 7/487* | (2006.01) |

(52) U.S. Cl.
CPC ............... *H04N 13/02* (2013.01); *G01S 7/484* (2013.01); *G01S 7/487* (2013.01); *G01S 7/4808* (2013.01); *G01S 17/89* (2013.01); *H04N 13/0253* (2013.01)

(58) Field of Classification Search
CPC ....... G01S 17/89; G01S 7/4808; G01S 7/484; G01S 7/487; H04N 13/02; H04N 13/0253
USPC ......................................................... 348/46
See application file for complete search history.

(56) References Cited

U.S. PATENT DOCUMENTS

2012/0075423 A1    3/2012   Kirmani et al.

OTHER PUBLICATIONS

A. Kirmani, Femtosecond Transient Imaging, MIT Masters Thesis, Aug. 2010.*

A. Kirmani. T. Hutchinson, J. Davis, R. Raskar, Looking Around the Corner Using Transient Imaging, ICCV1 2009, Proceedings of 2009 IEEE 12th International Conference on Computer Vision, 2009, pp. 159-166.*

A. Kirmani, T. Hutchinson, J. Davis, R. Raskar, Looking Around the Corner Using Transient Imaging, ICCV 2009, Proceedings of 2009 IEEE 12th International Conference on Computer Vision, 2009, pp. 159-166.

A. Kirmani, T. Hutchinson, J. Davis, R. Raskar, Looking Around the Corner Using Ultrafast Transient Imaging, International Journal of Computer Vision, vol. 95 Issue 1, Oct. 2011, pp. 13-28 (published online Jun. 23, 2011).

A. Kirmani, Femtosecond Transient Imaging, MIT Masters Thesis, Aug. 2010.

S. Seitz, Y. Matsushita, K. Kutulakos, A Theory of Inverse Light Transport, ICCV 2005, Proceedings of the 10th International Conference on Computer Vision, vol. 2, pp. 1440-1447, IEEE Computer Society, Washington, DC, USA, 2005.

(Continued)

*Primary Examiner* — Mohammed Rahaman
(74) *Attorney, Agent, or Firm* — Stephen R. Otis

(57) ABSTRACT

In exemplary implementations of this invention, a 3D range camera "looks around a corner" to image a hidden object, using light that has bounced (reflected) off of a diffuse reflector. The camera can recover the 3D structure of the hidden object.

20 Claims, 18 Drawing Sheets

(56) References Cited

OTHER PUBLICATIONS

A. Sume, M. Gustafsson, A. Janis, S. Nilsson, J. Rahm, A. Orbom, Radar detection of moving objects around corners, Radar Sensor Technology XIII, edited by Kenneth I. Ranney, Armin W. Doerry, Proc. of SPIE vol. 7308, 73080V, SPIE 2009.

B. Chakraborty, Y. Li, J. Zhang, T. Trueblood, A. Papandreou-Suppappola, D. Morrell, Multipath Exploitation with Adaptive Waveform Design for Tracking in Urban Terrain, ICASSIP 2010, Proceedings of 2010 IEEE International Conference on Acoustics Speech and Signal Processing, 2010, pp. 3894-3897.

* cited by examiner

INTENSITY (ARB. U.)

BACKPROJECTED INTENSITY (ARB. U.)

CONFIDENCE (ARB. U.)

NEAR　　　　　　FAR
DEPTH (ARB. U.)

INTENSITY (ARB. U.)

BACKPROJECTED INTENSITY (ARB. U.)

CONFIDENCE (ARB. U.)

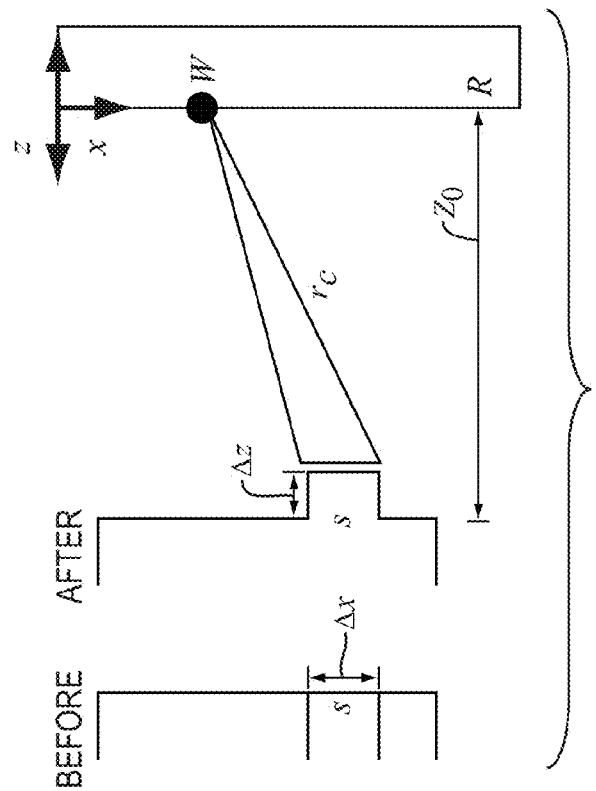
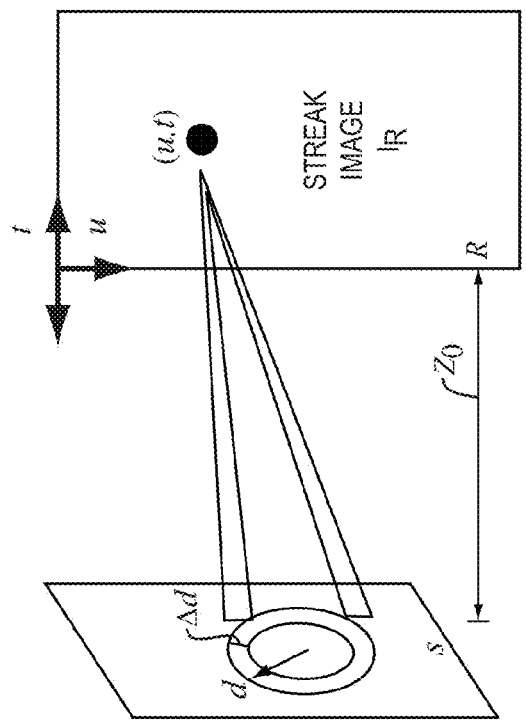
FIG. 10B
FIG. 10A

METHODS AND APPARATUS FOR IMAGING OF OCCLUDED OBJECTS FROM SCATTERED LIGHT

RELATED APPLICATIONS

This application claims the benefit of U.S. Provisional Application Ser. No. 61/544,780, filed Oct. 7, 2011, the entire disclosure of which is herein incorporated by reference.

This invention was made with government support under Contract No. W911NF-07-D-0004 awarded by the Army Research Office and under Contract No. N66001-10-1-4041 awarded by the Space and Naval Warfare Systems Center. The government has certain rights in this invention.

FIELD OF THE TECHNOLOGY

The present invention relates generally to imaging.

COMPUTER PROGRAM LISTING

The ASCII text files named Backproject_Clean.txt, backproject_multiple_fast.txt and backproject_fast.txt, with sizes of approximately 350 bytes, 2,599 bytes and 1,869 bytes, respectively, each created Sep. 28, 2012 (the "Source Code"), comprise a computer program listing for an exemplary implementation of this invention. These ASCII text files are is incorporated by reference herein.

BACKGROUND

The light detected on a camera sensor comprises light from objects that are in the line of sight, reflected light from objects that are not within the line of sight, and background light. Light from objects outside the line of sight reaches the sensor via one or more reflections (or bounces). In conventional imaging, it is difficult to exploit this light if the reflections or bounces are diffuse.

SUMMARY

In exemplary implementations of this invention, a 3D range camera "looks around a corner" to image a hidden object, using light that has bounced (reflected) off of a diffuse reflector. The camera can recover the 3D structure of the hidden object.

In exemplary implementations of this invention, the hidden object is behind at least one occluder, so the object is not in the direct line of sight of the camera. Nor is the hidden object visible to the camera by specular (mirror-like) reflection. Instead, the only light from the object that reaches the camera is light that bounces off of a diffuse reflector (e.g., a typical wall).

In exemplary implementations of this invention, time-of-flight technique and computational reconstruction algorithms are used to untangle image information mixed by diffuse reflection. A 3D range camera reconstructs the 3D geometry of a hidden object, using diffusely reflected light. In a prototype of this invention, the 3D camera achieves sub-millimeter depth precision and centimeter lateral precision over 40 cm×40 cm×40 cm of hidden space.

In exemplary implementations of this invention, a light source illuminates one scene spot at a time and records the reflected light after its interaction with the scene. An incoherent ultrafast imaging technique recovers 3D shapes of non-line-of-sight objects using this diffusely reflected light. The scene is illuminated with an ultra-short pulse of laser light (e.g., a 50 femtosecond pulse). The time of flight of returning light is used as a means to analyze direct and scattered light from the scene. The extra temporal dimension of the observations under very high temporal sampling rates makes the hidden 3D structure observable. With a single or a few isolated hidden patches, pulses recorded after reflections are distinct and can be easily used to find 3D position of the hidden patches. However, with multiple hidden scene points, the reflected pulses may overlap in both space and time when they arrive at the detector. The loss of correspondence between 3D scene points and their contributions to the detected pulse stream is a technical challenge. A computational algorithm based on back-projection inverts this process.

In exemplary implementations, this invention has many practical applications. For example, the ability to record 3D shapes beyond the line of sight can be applied in industrial inspection, endoscopy, disaster relief scenarios or more generally in situations where direct imaging of a scene is impossible.

The above description of the present invention is just a summary. It is intended only to give a general introduction to some illustrative implementations of this invention. It does not describe all of the details of this invention. This invention may be implemented in many other ways.

BRIEF DESCRIPTION OF THE DRAWINGS

FIG. 3A shows streak images captured by pointing a laser beam at different points on a diffusely reflecting surface.

FIG. 3B shows portions of three ellipses. The three ellipses show possible locations of points on the patch that could have contributed light intensity to three different streak image pixels, respectively.

FIG. 3C shows a summation of all elliptical curves from all pixels in a single streak image.

FIG. 3D shows a summation of all elliptical curves from all pixels in a set of sixty streak images.

FIG. 3E shows an image obtained after filtering with a second derivative. In the image, the patch location and 2-cm lateral size are recovered.

FIG. 4A is a photograph of the mannequin.

FIG. 4B shows nine of sixty raw streak camera images.

FIG. 4C is a visualization of the heatmap after backprojection.

FIG. 4D shows an image obtained by filtering the heatmap. The image comprises a projection, on the x-y plane, of a second derivative of the heatmap along depth z.

FIG. 4E is a depth map that shows distance of different parts of the mannequin from the diffuser wall.

FIG. 4F is a confidence map (i.e., a rendered point cloud of confidence values) after applying soft thresholds.

FIGS. 4G and 4H show the mannequin from different viewpoints after application of a volumetric blurring filter.

FIG. 4I shows stop-motion animation frames from multiple poses.

FIG. 5A is a photograph of the three letters (I, T, I).

FIG. 5B shows nine of sixty raw streak camera images.

FIG. 5C shows a projection, on the x-y plane, of a heatmap created by a backprojection algorithm.

FIG. 5D shows an image obtained by filtering with the second derivative along depth z.

FIG. 5E is a rendering of the reconstructed 3D shape of the three letters.

FIG. 6A shows light propagating from the surface of a hidden object. FIG. 6B shows spherical wavefronts contributing to a streak image.

FIG. 7A is the raw streak photo. FIG. 7B shows a blurred hyperbola in a warped photo. FIG. 7C shows a low frequency residual created by backpropagation. FIG. 7D shows an estimate of the geometry of the hidden object.

FIGS. 10A and 10B are diagrams that show a benefit of ultra-fast time imaging. FIG. 10A illustrates how a displacement of a patch is detected by a traditional still camera. FIG. 10B illustrates how such displacement may be detected by a camera with time resolution.

FIG. 11A shows distance estimation. FIG. 11B shows time of arrival error. FIG. 11C shows a plot of intensity as a small patch is moved perpendicular to a surface.

The above Figures illustrate some illustrative implementations of this invention, or provide information that relates to those implementations. However, this invention may be implemented in many other ways. The above Figures do not show all of the details of this invention.

DETAILED DESCRIPTION

In exemplary implementations of this invention, a 3D range camera "looks around a corner" to image a hidden object, using light that has bounced (reflected) off of a diffuse reflector. The camera can recover the 3D structure of the hidden object.

Figure 1:
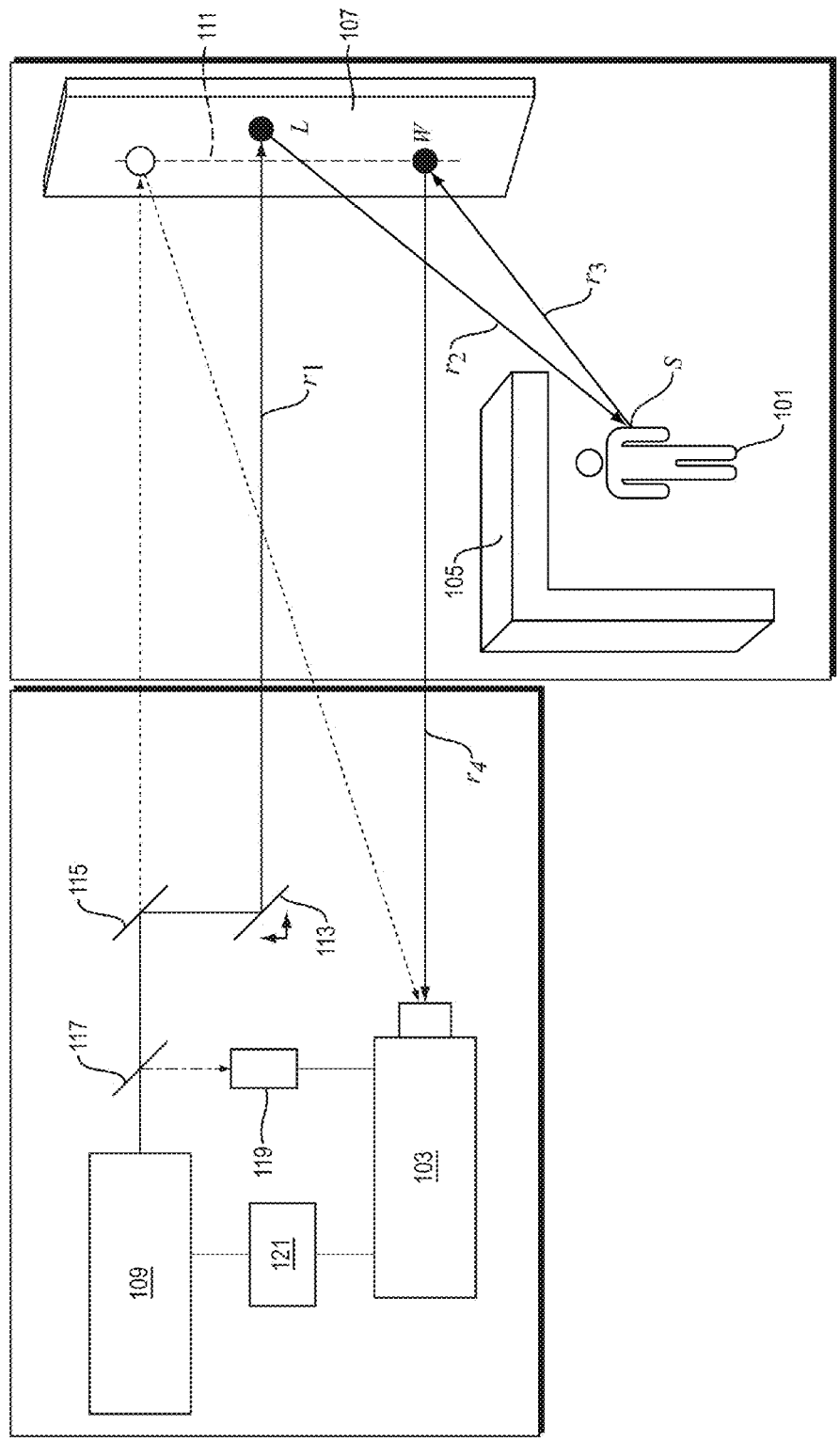
FIG. 1 is a diagram that shows an example of imaging around a corner. The object being imaged is hidden from direct line of sight by an occluder.

FIG. 1 is a diagram that shows an example of imaging around a corner. The object 101 being imaged is hidden from direct line of sight of the streak camera 103 by an occluder 105. A series of images are captured by sequentially illuminating different points on a diffusely reflective wall 107 (one point at a time) with a pulsed laser 109. As each of these different points on the wall 107 are illuminated by the laser 109, a streak camera 103 records a streak camera image of light diffusely reflecting back from hidden object 101. The streak camera is focused on a line segment on wall 107 indicated by dashed line segment 111. A processor 121 controls the imaging system, including the camera and the laser.

In the example shown in FIG. 1, the laser pulse travels a distance $r_1$ to strike the wall at a point L, some of the diffusely scattered light strikes the hidden object (for example at s after traveling a distance $r_2$), returns to the wall (for example at w, after traveling over $r_3$) and is collected by the camera after traveling the final distance $r_4$ from w to the camera center of projection. The position of the laser beam on the wall is changed by a set of galvanometer actuated mirrors 113.

In the example shown in FIG. 1, the diffusely reflecting wall 107 is a 40 cm high and 25 cm wide wall. This wall 107 is sometimes referred to as the diffuser wall. The ultrafast laser 109 and streak camera 103 are both directed at this wall 107. Beam splitter 115 directs an attenuated portion of the laser beam into the field of view of the streak camera 103, for use as a time reference. Beam splitter 117 (e.g., a glass plate) directs another attenuated portion of the laser beam to a photodetector 119. This attenuated beam is used to synchronize the laser and streak camera.

In the example shown in FIG. 1, the target object (a mannequin) 101 is hidden, so that direct light paths between the target 101 and the laser 109 or the camera 103 are blocked. The imaging system produces three dimensional range data of the target 101.

The streak camera 103 records a streak image with one spatial dimension and one temporal dimension. In each of the streak images shown in FIGS. 2, 3A, 4B, and 5B, the y-axis corresponds to time and the x-axis corresponds to a spatial dimension. Specifically, the x-axis in these streak images corresponds to different spatial positions on the streak camera sensor (and thus to different spatial positions on the diffuser wall).

In the example shown in FIG. 1, the streak camera 103 is focused on a line segment on the diffuser wall 107 indicated by dashed line segment 111. The main laser beam from the scanning laser 109 hits spots on the wall that do not lie on line segment 111 so that single bounce light does not enter the camera 103. (For example, if the line segment 111 is oriented horizontally, then the laser beam hits spots above or below line segment 111). Though the target object 101 is occluded, light from the laser beam is diffusely reflected by the wall 107, reaches the target object 101, is reflected by multiple surface patches and returns back to the diffuser wall 107, where it is reflected again and captured by the camera 103.

In the example shown in FIG. 1, the laser emits 50 fs long pulses. The camera digitizes information in time intervals of 2 ps. The geometry of the directly visible part of the setup is known. Hence the only unknown distances in the path of the laser pulses are those from the diffuser wall to the different points on the occluded target object and back (paths $r_2$ and $r_3$ in FIG. 1). The 3D geometry of the occluded target is thus encoded in the streak images acquired by the camera. These streak images are decoded using a reconstruction algorithm. The recorded streak images lack correspondence information, i.e., it is unknown which pulses received by the camera came from which surface point on the target object. Hence, a straightforward triangulation or trilateration to determine the hidden geometry is not possible.

Figure 2:
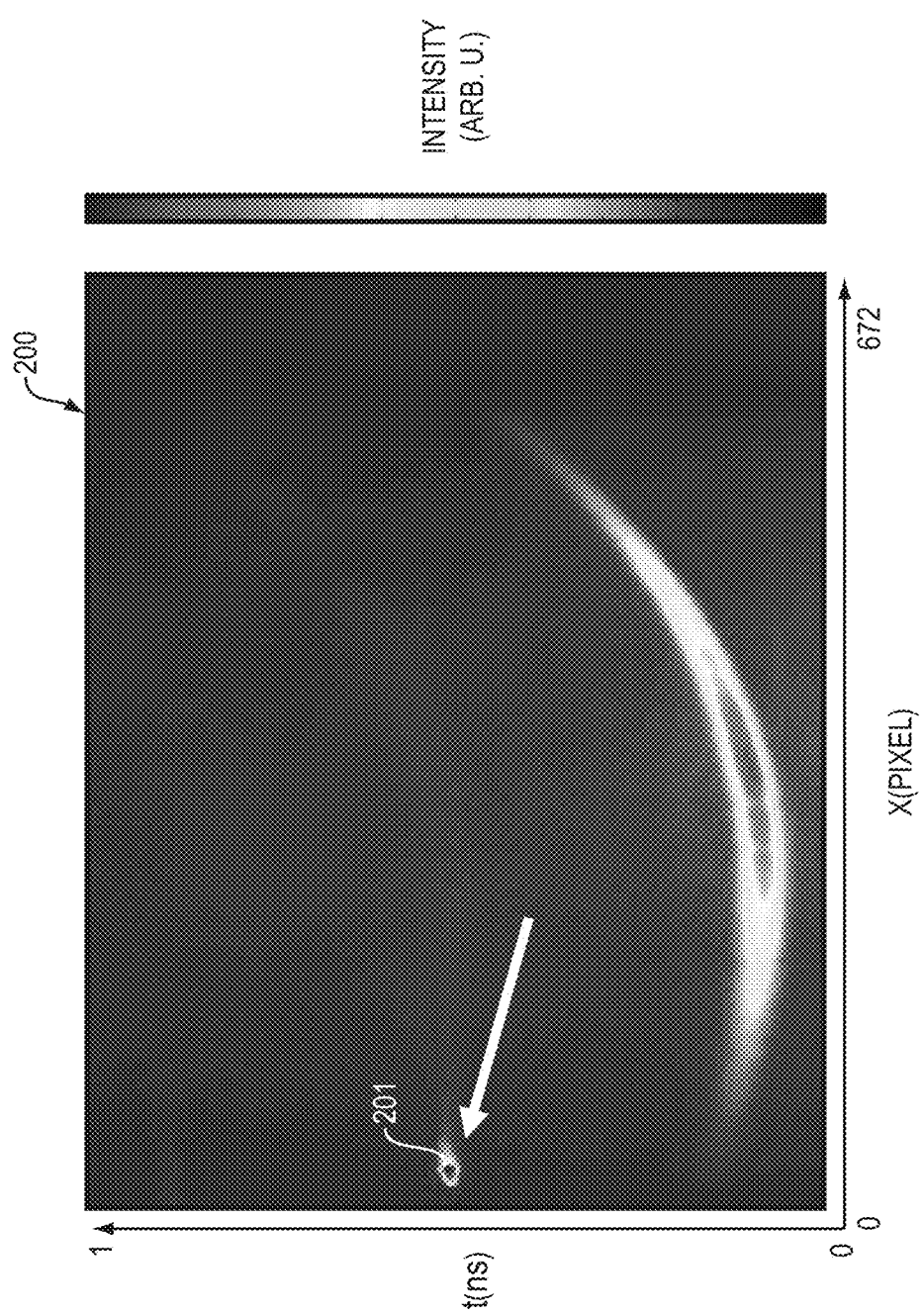
FIG. 2 is a streak image with a calibration spot.

FIG. 2 is a streak image 200 with a calibration spot 201 (indicated by an arrow). The calibration spot 201 is used to monitor the long term stability of the system and calibrate for drifts in timing synchronization. The calibration spot 201 is created by an attenuated beam split off the laser beam that strikes the wall in the field of view of the camera. (In the example shown in FIG. 1, this attenuated beam strikes a point on line segment 111.)

FIGS. 3A to 3E show an example of geometric reconstruction of a 2 cm×2 cm hidden square patch using streak camera images.

Figure 3A:
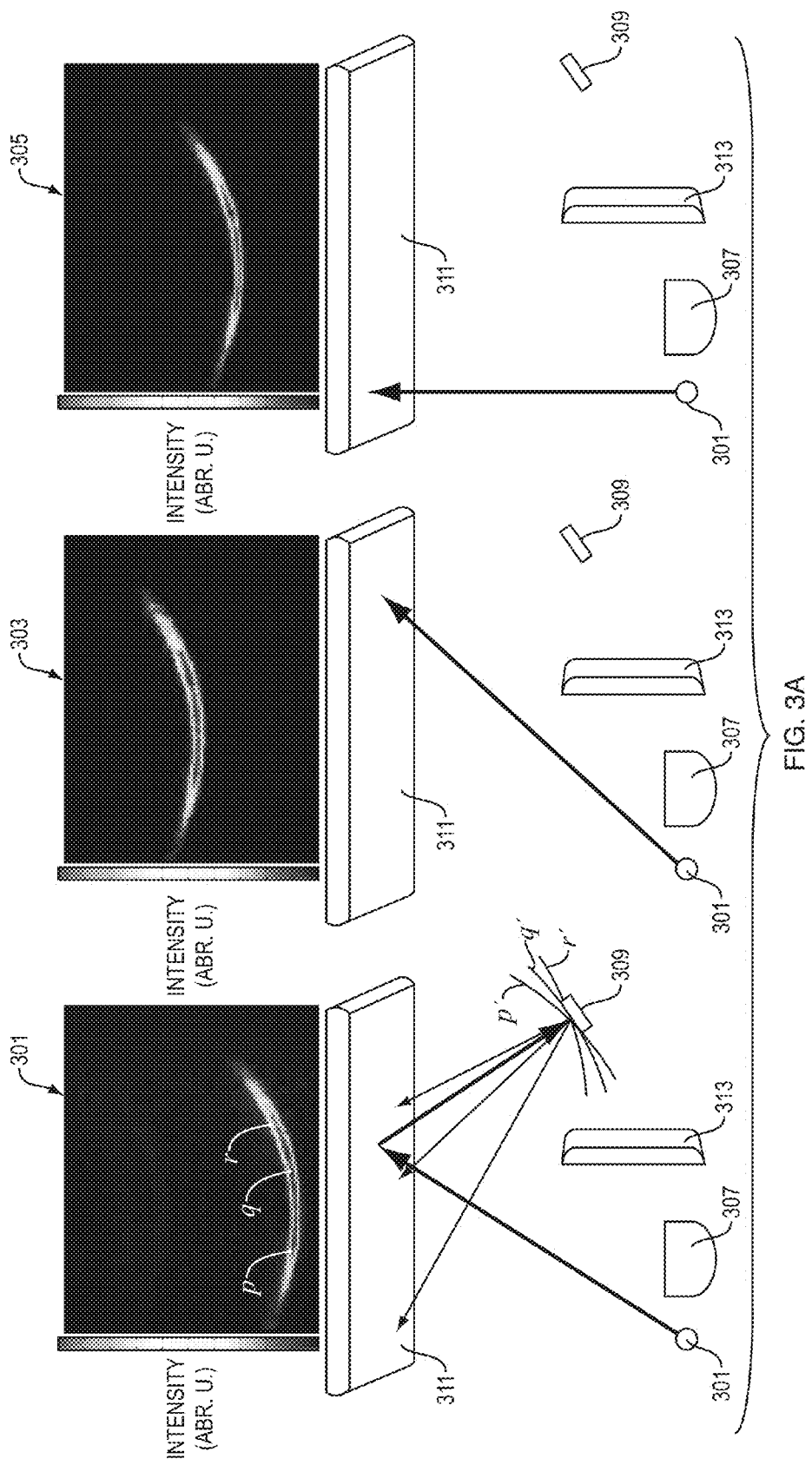
FIGS. 3A to 3E show an example of geometric reconstruction of a 2 cm×2 cm hidden square patch using streak camera images.

FIG. 3A shows three different streak images 301, 303, 305 captured by a streak camera 307 as a laser beam is pointed at three different points, respectively, on a diffusely reflecting surface 311.

In the example shown in FIG. 3A, the hidden object 309 is hidden from the camera's line of sight by an occluder 313. The hidden object 309 consists of a 2 cm×2 cm size square white patch that is mounted in the scene. The three captured streak images 301, 303, 305 correspond to three different positions of the laser beam 301. Data is collected for different laser beam positions. Shapes and timings of the recorded response vary with laser positions and encode the position and shape of the hidden patch.

Figure 3B:
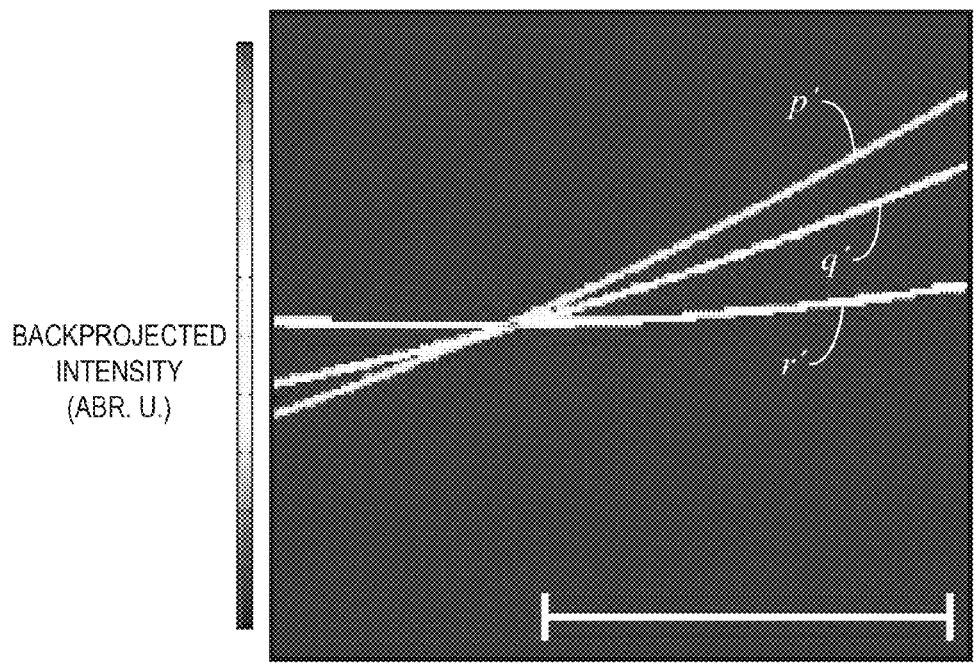

FIG. 3B shows portions of three ellipses. The three ellipses show possible locations of points on the target patch 309 that could have contributed light intensity to three different streak image pixels, respectively. The possible locations in Cartesian space that could have contributed light intensity to streak image pixels p, q, r are the ellipses p', q', r' (ellipsoids in 3D). For illustration, these three ellipse sections are also shown in FIG. 3A in Cartesian coordinates. If there is a single world point contributing intensity to all 3 pixels, the corresponding ellipses intersect, as is the case here. A back-projection algorithm is used, for each streak image, to find overlayed ellipses corresponding to all pixels in that streak image.

Figure 3C:
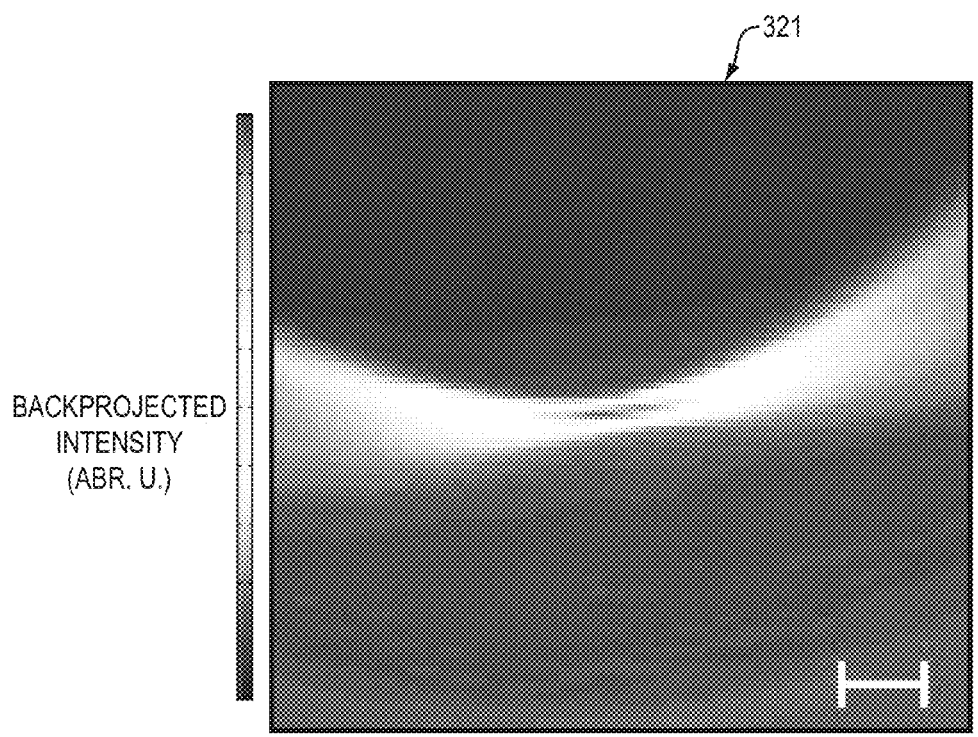
Figure 3D:
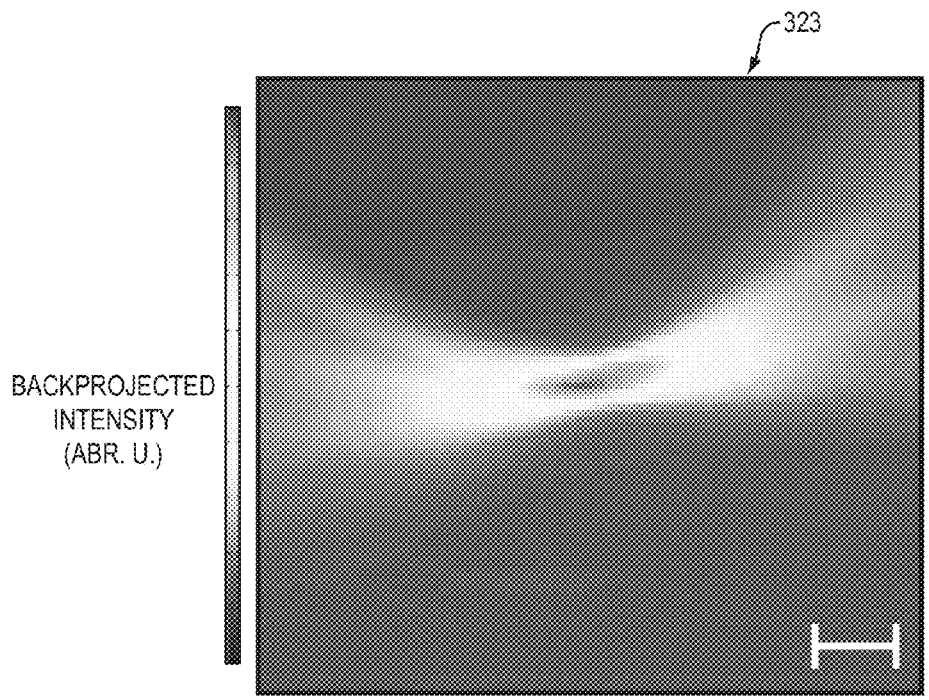
Figure 3E:
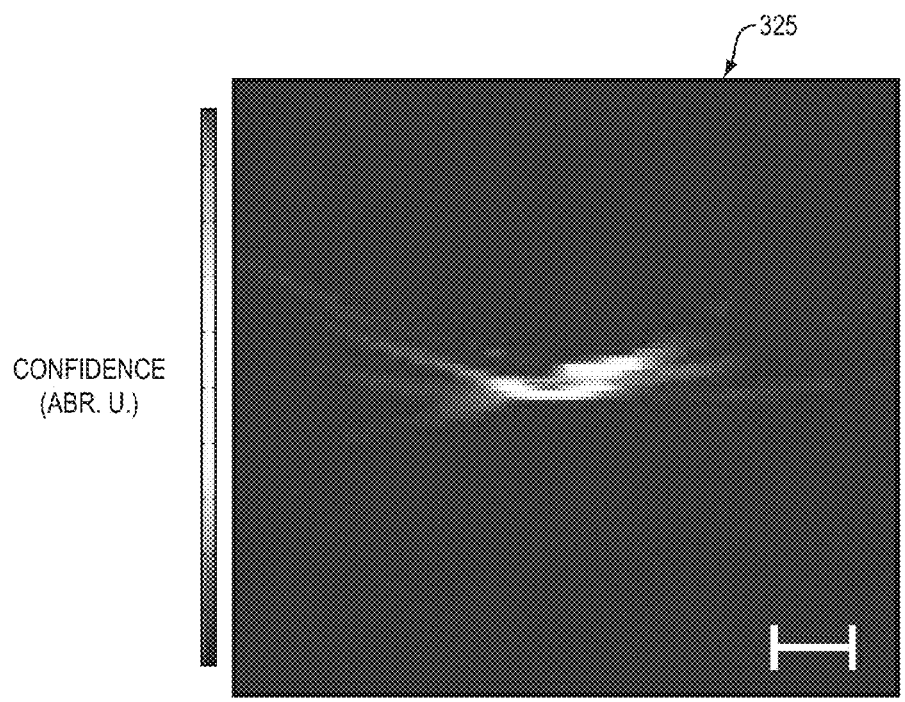

FIG. 3C shows a summation (321) of all elliptical curves from all pixels in the single streak image shown on the right side of FIG. 3A. FIG. 3D shows a summation (323) of all elliptical curves from all pixels in a set of 60 streak images. FIG. 3E shows an image 325 obtained after filtering the summation shown in FIG. 3D with a second derivative. In the image shown in FIG. 3E, the patch location and 2-cm lateral size of the patch are recovered.

In FIGS. 3B, 3C, 3D, 3E: (a) the white bar corresponds to 2 cm; and (b) the horizontal and vertical axes correspond to x and y axes, respectively, in a 3D Cartesian coordinate system for the volume occupied by the hidden object. Although color is not shown in FIGS. 3B, 3C, 3D, 3E, these images may be color-coded, e.g., for back-projected light intensity in FIGS. 3B, 3C, 3D and for confidence level in FIG. 3E.

Consider a simple scenario with a small hidden patch 309 as illustrated in FIG. 3A. It provides intuition on how the geometry and location of the target object are encoded in the streak images. The reflected spherical pulse propagating from the hidden patch 309 arrives at the points on the diffuser wall 311 with different time delays and creates a hyperbolic curve in the space-time streak image. The position of the laser spot on the diffuser wall is scanned and successively changed. The shape and position of the recorded hyperbolic curve varies accordingly. Each pixel in a streak image corresponds to a finite area on the wall and a 2 ps time interval, a discretized space-time bin. However, the effective time resolution of the system is 15 ps due to a finite temporal point spread function of the camera.

The inverse process to recover the position of the small hidden patch from the streak images is illustrated in FIG. 3B-3E. Consider three pixels p, q and r in the streak image at which non zero light intensity is measured (FIG. 3A). The possible locations in the world which could have contributed to a given pixel lie on an ellipsoid in Cartesian 3D space. The foci of this ellipsoid are the laser spot on the diffuser wall and the point on the wall observed by that pixel. For illustration, only a 2D slice of the ellipsoid, i.e., an ellipse, is shown in FIG. 3B. The individual ellipses from each of the three pixels p, q and r intersect at a single point. In the absence of noise, the intersection of three ellipses uniquely determines the location of the hidden surface patch that contributed intensity to the three camera pixels. In practice, correspondence is lacking, i.e., it is unknown whether or not light detected at two pixels came from the same 3D surface point.

Therefore, in the example shown in FIGS. 3B-3E, one or more computer processors discretize the Cartesian 3D space into voxels and compute the likelihood of the voxel being on a hidden surface. The processors determine, for each voxel, all streak image pixels that could potentially have received contributions of this voxel based on the time of flight $r_1+r_2+r_3+r_4$. Also, the processors sum up the measured intensity values in these pixels. In effect, each pixel votes for all points on the corresponding ellipsoid. The signal energy contributed by each pixel is amplified by a factor to compensate for the distance attenuation. If the distance attenuation factor were not accounted for, the scene points that are far away from the wall would be attenuated by a factor of $(r_2 r_3)^2$ and would be lost during the reconstruction. Therefore, the contribution of each pixel to a particular voxel is amplified by a factor of $(r_2 r_3)^\alpha$ before backprojection. Reconstruction quality depends weakly on the value of $\alpha$. For example, $\alpha=1$ is a good choice for reduced computation time.

As used herein, the term "backprojection" includes this process of computing likelihood by summing up weighted intensities. As used herein, the term "heatmap" includes a 3D scalar function on voxels that results from backprojection.

The summation of weighted intensities from all pixels in a single streak image creates an approximate heatmap for the target patch (FIG. 3C). Repeating the process for many laser positions on the diffuser wall, and using pixels from the corresponding streak images provides a better approximation (FIG. 3D). In a prototype of this invention, approximately 60 laser positions are used. Traditional backprojection requires a high-pass filtering step. Instead, in this prototype, the second derivative of the data along the z direction of the voxel grid and approximately perpendicular to the wall is employed as an effective filter. For example, this second derivative was used to recover the hidden surface patch in FIG. 3E. Because values at the voxels in the heatmap are the result of summing a large number of streak image pixels, the heatmap contains low noise and the noise amplification associated with a second derivative filter is acceptable.

In exemplary implementations, this invention is implemented with at least the following steps: First, a pulsed laser sequentially illuminates different spots on the diffuser wall (one spot at a time) and a streak camera records an image of the line segment of the wall. Second, a computer processor estimates an oriented bounding box for the working volume (in which the target object is located) and sets up a voxel grid representative of Cartesian 3D space for the working volume. Third, a computer processor performs a backprojection calculation, in which it computes, for each voxel, the summation of weighted intensities of all streak image pixels that could potentially have received contributions of this voxel based on the time of flight. Fourth, the resulting three dimensional heatmap of voxels is stored in memory. Fifth, the back-projected heatmap is filtered. A computer processor calculates a second derivative of the heatmap along the direction of the voxel grid facing away from the wall (the z-direction). Sixth, in an optional post processing step, a processor computes a confidence value for each voxel by computing local contrast with respect to the voxel neighborhood in the filtered heatmap. To compute contrast, each voxel heatmap value is divided by the maximum in the local neighborhood. For better visualization, a soft threshold is applied to the voxel confidence value.

A computer processor estimates the oriented bounding box of the object in the second step by running the above algorithm at low spatial target resolution and with downsampled input data.

FIGS. 4A to 4I show an example of geometric reconstruction of a hidden object (a mannequin) using streak camera images. The streak images were captured from diffusely reflecting light, when the mannequin was hidden behind an occluder.

Figure 4A:
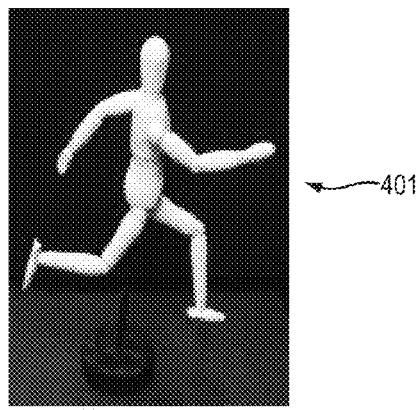
FIGS. 4A to 4I show an example of geometric reconstruction of a hidden object (a mannequin) using streak camera images.
Figure 4B:
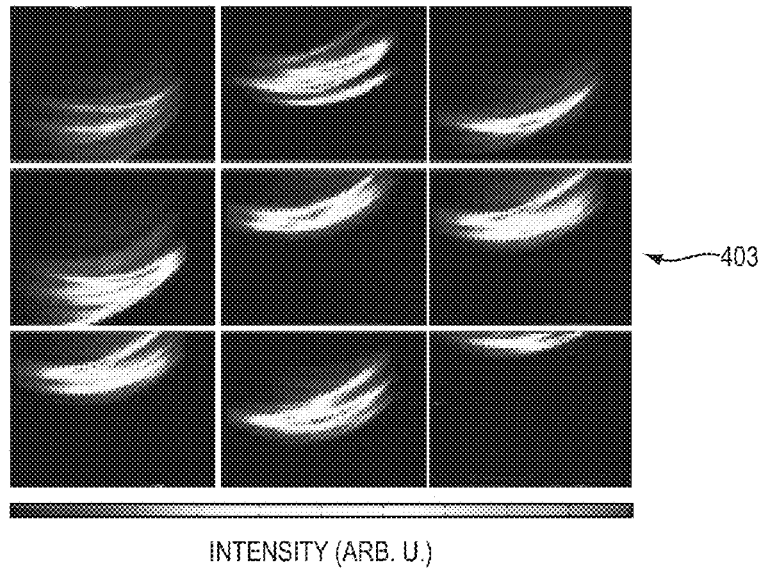
Figure 4C:
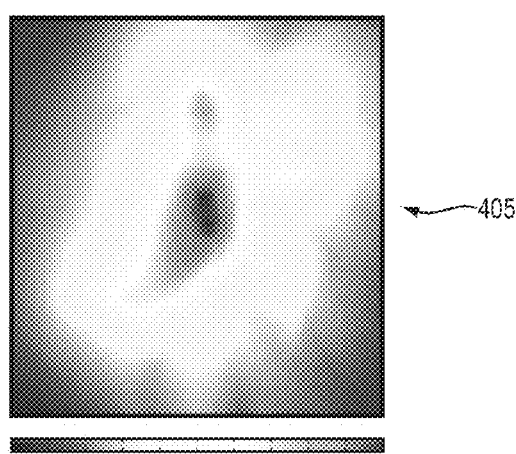
Figure 4D:
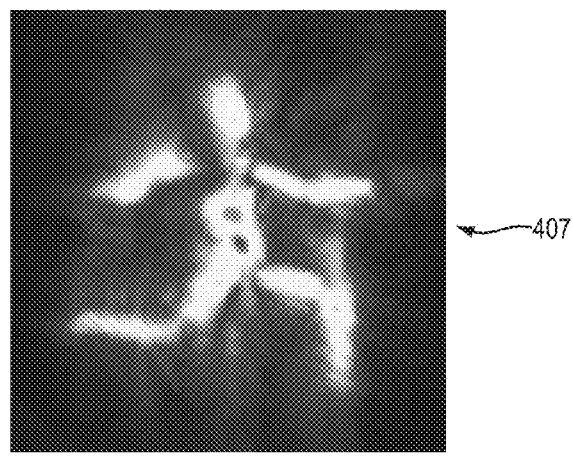
Figure 4E:
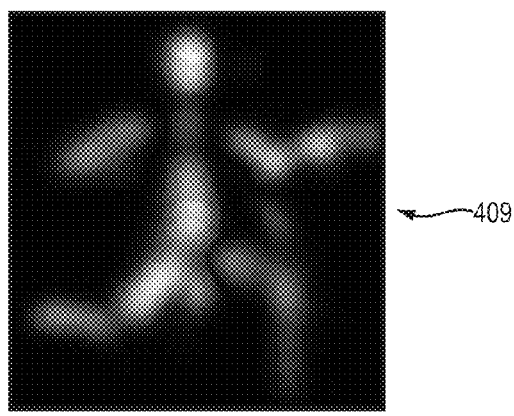
Figure 4F:
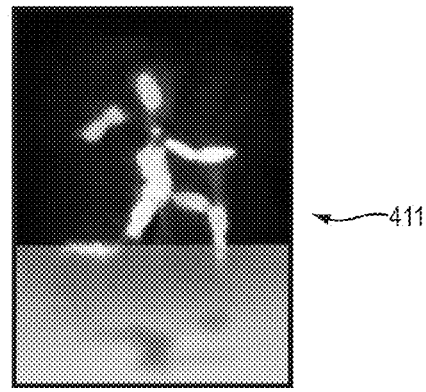
Figure 4G:
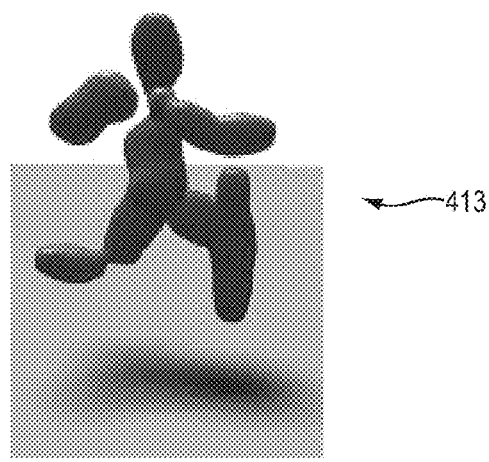
Figure 4H:
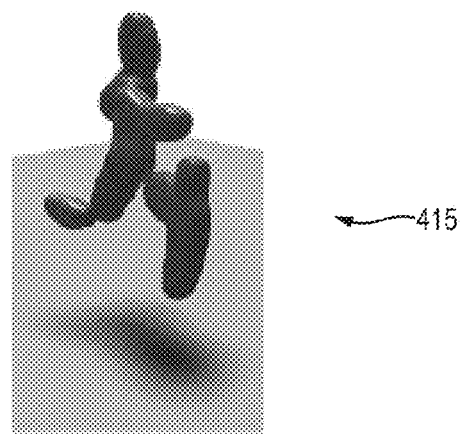
Figure 4I:
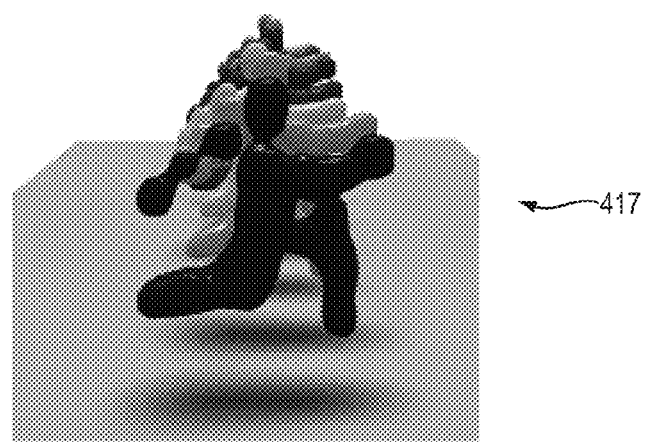

FIG. 4A is a photograph of the mannequin 401. FIG. 4B shows nine of sixty raw streak camera images 403. FIG. 4C is a visualization 405 of the heatmap after backprojection. FIG. 4D shows an image 407 obtained by filtering the heatmap. The image comprises a projection, on the x-y plane, of a second derivative of the heatmap along depth z. FIG. 4E is a depth map 409 that shows distance of different parts of the mannequin from the diffuser wall. FIG. 4F is a confidence map (i.e., a rendered point cloud of confidence values) 411 after applying soft thresholds. FIGS. 4G and 4H show the mannequin from different viewpoints 413, 415 after application of a volumetric blurring filter. FIG. 4I shows stop-motion animation frames 417 from multiple poses.

In FIGS. 4B, 4C, 4D: the horizontal and vertical axes correspond to x and y axes, respectively, in a 3D Cartesian coordinate system for the volume occupied by the hidden object (mannequin). Although color is not shown in FIGS. 4B, 4C, 4D, these images may be color-coded, e.g., for intensity in FIG. 4B, for back-projected light intensity in FIG. 4C, and for confidence level in FIG. 4D.

FIGS. 5A to 5E show an example of geometric reconstruction of three letters using streak camera images. The streak images were captured from diffusely reflecting light, when the three letters were hidden behind an occluder.

Figure 5A:
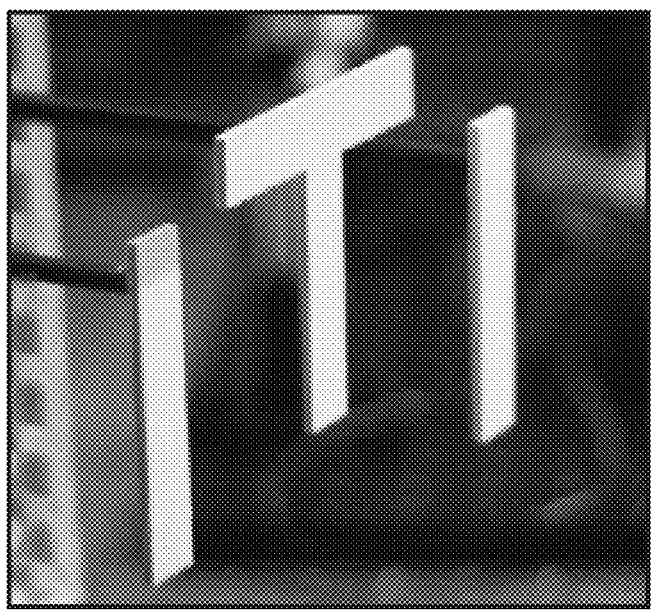
FIGS. 5A to 5E show an example of geometric reconstruction of three letters using streak camera images. The streak images were captured from diffusely reflecting light, when the three letters were hidden behind an occluder.
Figure 5B:
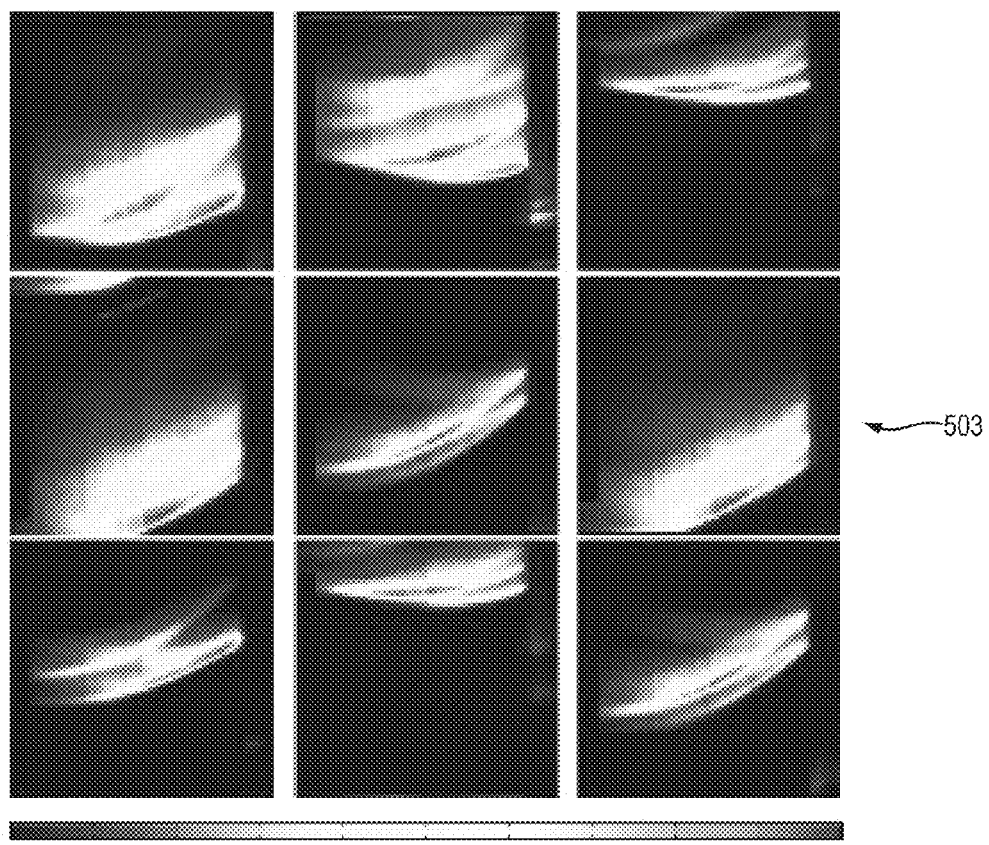
Figure 5C:
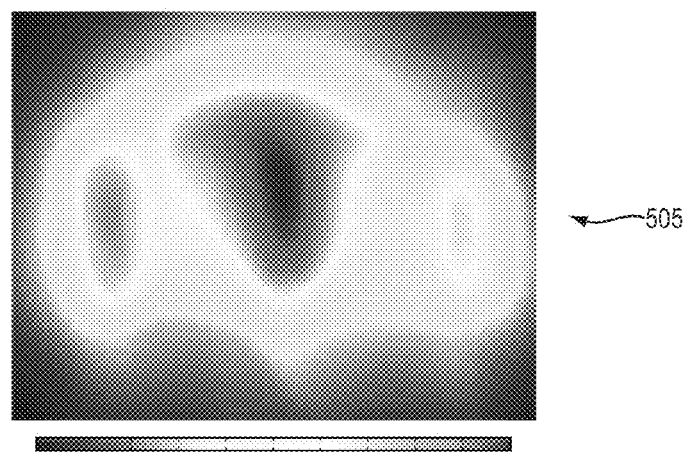
Figure 5D:
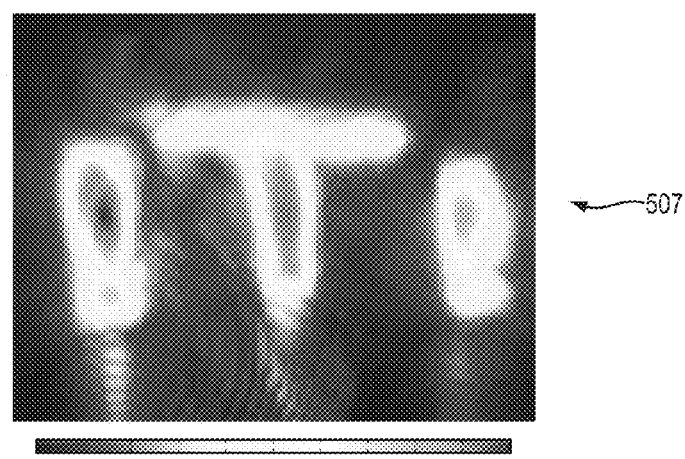
Figure 5E:
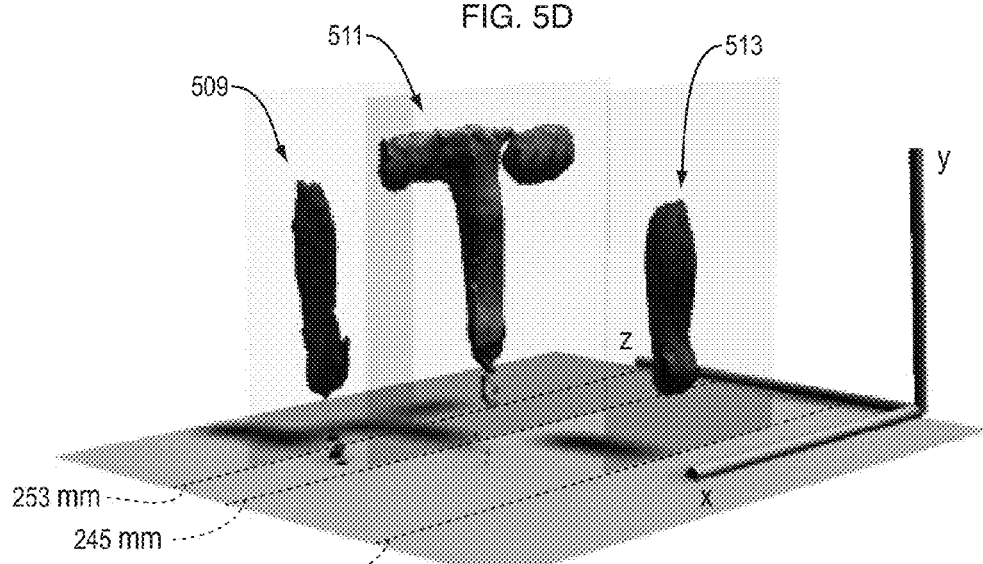

FIG. 5A is a photograph of the three letters (I, T, I) 501. FIG. 5B shows nine of sixty raw streak camera images 503. FIG. 5C shows a projection 505, on the x-y plane, of a heatmap created by a backprojection algorithm. FIG. 5D shows an image 507 obtained by filtering with the second derivative along depth z. FIG. 5E is a rendering of the reconstructed 3D shape of the three letters 509, 511, 513. In FIG. 5E, dashed lines are inserted to indicate ground truth at (from back to front) 253 mm, 245 mm and 222 mm, respectively, and the depth axis is scaled to aid visualization of depth resolution.

FIGS. 4A-4I and 5A-5E show examples of 3D reconstruction of multi-part hidden objects (a mannequin in FIG. 4 and three letters in FIG. 5). The mannequin in FIG. 4 contains non-planar surfaces with variations in depth and occlusions. As shown in FIGS. 4A-4I, major geometrical features of the object are recovered. FIG. 4I shows reconstructions of the same object (the mannequin) in slightly different poses, demonstrating reproducibility and stability of the method as well as the consistency in the captured data. In exemplary implementations, reconstruction of a hidden object is based on data acquired from light that is diffusely reflected from near-Lambertian opaque surfaces. Parts of the object that are occluded from the diffuser wall or facing away from it are not reconstructed.

FIGS. 5A-5E show a reconstruction of multiple planar objects at different unknown depths. The object planes and boundaries are reproduced accurately to demonstrate depth and lateral resolution. The reconstruction is affected by several factors such as calibration, sensor noise, scene size and time resolution.

The sources of calibration errors include lens distortions on the streak camera that lead to a warping of the collected streak image, measurement inaccuracies in the visible geometry, and measurement inaccuracies of the center of projection of the camera and the origin of the laser. For larger scenes, the impact of static calibration errors is reduced.

The sensor introduces intensity noise and timing uncertainty, i.e., jitter. The reconstruction of 3D shapes is more dependent on the accuracy of the time of arrival than the signal to noise ratio (SNR) in received intensity. Jitter correction, described in more detail below, is helpful, but does not remove all uncertainties. Improving the SNR is desirable because it yields faster capture times. The SNR can be significantly improved by using an amplified laser with more energetic pulses and a repetition rate in the kHz range and a triggered camera. In that case, the overall light power would not change, but fewer measurements for light collection could significantly reduce signal independent noise such as background and shot noise.

In some implementations, the imaging system can be scaled for larger distances and bigger target objects. Larger systems can be built without any change in the ratio of received and emitted energy (i.e., the link budget) by using a longer pulse, with proportionally reduced target resolution and increased aperture size. Note that when the distance $r_2$ between diffuser wall and the hidden object (see FIG. 1) is increased without increasing the size of the object, the signal strength drops dramatically ($\propto 1/(r_2 r_3)^2$) and the size of the hidden scene is therefore limited. However, in some implementations, this invention can be used even when laser and camera are very far from the rest of the scene. A loss in received energy can be reduced in two ways. The laser beam can be kept collimated over relatively long distances and the aperture size of the camera can be increased to counterbalance a larger distance between camera and diffuser wall.

The timing resolution, along with spatial diversity in the positions of spots illuminated and viewed by the laser and the camera, affects the resolution of 3D reconstructions. Additional factors include the position of the voxel in Cartesian space and the overall scene complexity. In a prototype of this invention, translation along the direction perpendicular to the diffuser wall can be resolved with a resolution of 400 μm—better than the full width half maximum (FWHM) time resolution of the prototype imaging system. In this prototype, lateral resolution in a plane parallel to the wall is lower and is limited to 0.5-1 cm depending on proximity to the wall.

In exemplary implementations of this invention, 3D imaging of hidden three dimensional geometry is performed from scattered light in free space. The loss of information in the spatial light distribution caused by the scattering process is compensated by capturing ultrafast time of flight information.

In some implementations of this invention, the reconstruction method assumes that light is only reflected once by a discrete surface on the hidden object without inter-reflections within the object and without sub-surface scattering. It further assumes that light travels in a straight line between reflections. In these implementations, light that does not follow these assumptions will appear as time-delayed background in the heatmap and will complicate, but not necessarily prevent, reconstruction.

In some implementations of this invention, it is preferable to limit the output power of the laser (because higher output power generally increases the intensity of the light striking the scene and can cause safety issues and in extreme cases damage the scene material). The intensity can be lowered by increasing the laser beam diameter. But a large diameter limits time resolution. Using techniques in computational photography such as coded illumination, a sequence of basis coded pattern can be projected that has reduced energy per unit area.

In exemplary implementations of this invention, the laser is directed to various positions on the diffuser wall and the camera captures one streak image for each position. The position of a hidden point s (FIG. 1) is determined with highest confidence along the normal N to an ellipsoid through s with foci at the laser spot, L, and the wall point, w. Large angular diversity through a wide range of angles for N for all such pairs to create baselines is preferable. N is the angle bisector of ∠Lsw.

The location and spacing of the laser positions on the wall can have a big impact on reconstruction performance. Preferably, the laser positions are chosen so as to provide good angular diversity. For example, in a prototype implementation of this invention, there are 60 laser positions in 3-5 lines perpendicular to the line on the wall observed by the 1D streak camera. In this prototype, this configuration yields significantly better results than putting the laser positions on few lines parallel to the camera line.

In exemplary implementations of this invention, the reconstruction method is well-suited for Lambertian reflectance of surfaces. The method is also robust for near-Lambertian surfaces, e.g., surfaces with a large diffuse component, and they are implicitly handled in our current reconstruction algorithm. The surface reflectance profile only affects the relative weight of the backprojection ellipses and not their shapes. The shape is dictated by the time of flight which is independent of the reflectance distribution.

Prototype:

Here is a description of a prototype of this invention:

In this prototype: The light source is a Kerr lens mode-locked Ti:Sapphire laser. It delivers pulses of about 50 fs length at a repetition rate of 75 MHz. Dispersion in the optical path of the pulse does not stretch the pulse beyond the resolution of the camera of 2 ps and therefore can be neglected. The laser wavelength is centered at 795 nm. The main laser beam is focused on the diffuser wall with a 1 m focal length lens. The spot created on the wall is about 1 mm in diameter and is scanned across the diffuser wall via a system of two galvanometer actuated mirrors. A small portion of the laser beam is split off with a glass plate and is used to synchronize the laser and streak camera as shown in FIG. 1. The diffuser wall is placed 62 cm from the camera. FIGS. 3A-3E and 4A-4I show examples of this prototype being used. In the example shown in FIG. 3, the mannequin object is placed at a distance of about 25 cm to the wall. In the example shown in FIGS. 4A-4I, the letters are placed at 22.2 cm to 25.3 cm from the diffuser wall.

In this prototype, time jitter correction may be achieved as follows: Another portion of the beam is split off, attenuated and directed at the wall as the calibration spot. The calibration spot is in the direct field of view of the camera and can be seen in FIG. 2. The calibration spot serves as a time and intensity reference to compensate for drifts in the synchronization between laser and camera as well as changes in laser output power. It also helps in detecting occasional shifts in the laser direction due to, for example, beam pointing instabilities in the laser. If a positional shift is detected, the data is discarded and the system is re-calibrated. The streak camera's photocathode tube, much like an oscilloscope, has time decayed burn out and local gain variations. A reference background photo can be used to divide and compensate.

In this prototype, the camera is a Hamamatsu® C5680 streak camera that captures one spatial dimension, i.e., a line segment in the scene, with an effective time resolution of 15 ps and a quantum efficiency of about 10%. The position and viewing direction of the camera are fixed. The diffuser wall is covered with Edmund Optics NT83 diffuse white paint In this prototype, a set of Matlab® routines is used to implement the backprojection based reconstruction.

In this prototype, a CMM (coordinate measuring machine) is used to measure the geometry of the visible scene and also to gather data about a sparse set of points on hidden objects for comparative verification. The CMM is a FARO Gage® digitizer arm. The digitizer arm data is used as ground truth for later independent verification of the position and shape of hidden objects as shown via transparent planes in FIG. 4E. After calibration, the camera and laser are treated as a rigid pair with known intrinsic and extrinsic parameters.

In this prototype, a computer processor estimates the oriented bounding box around the hidden object using a lower resolution reconstruction. For this estimation, the spatial resolution is reduced to 8 mm/voxel and the input data is downsampled by a factor of 40. A 40 cm×40 cm×40 cm volume spanning the space in front of the wall in 2-4 s is scanned to determine the bounding box of a region of interest. The finer voxel grid resolution is 1.7 mm in each dimension. The coarse reconstruction obtained can be used to set up a finer grid within this bounding box. Alternatively, an optimized bounding box can be set from the collected ground truth. The latter approach can reduce reconstruction time. The principal axes of the low resolution approximation may be computed and used to orient the fine voxel grid with these axes.

In a post-processing step for this prototype, surface visualization may be improved by estimating local contrast and applying a soft threshold. The confidence value for a voxel is $V' = \tan h(20(V-V_0))V/M_{loc}$, where V is the original voxel value in filtered heatmap and $m_{loc}$ is a local maximum computed in a 20×20×20 voxel sliding window around the voxel under consideration. Division by $m_{loc}$ normalizes for local contrast. The value $V_0$ is a global threshold and set to 0.3 times the global maximum of the filtered heatmap. The tan h function achieves a soft threshold.

In this prototype, the laser emits a pulse every 13.3 ns (75 MHz) and consequently the reflected signal repeats at the same rate. The streak tube readout camera averages 7.5 million such 13.3 ns windows in a 100 ms exposure time. 50 to 200 such images are added to minimize noise from the readout camera. The light returned from a single hidden patch is attenuated in the second, third and fourth path segments. In this prototype, this attenuation factor is $10^{-8}$. Attenuation in the fourth path segment can be partially counteracted by increasing the camera aperture.

This invention is not limited to the prototype described above. It can be implemented in many other ways.

Modeling Light Pulse Propagation:

This section discusses the relationship between the hidden scene geometry and the observed space time light transport. This relationship can be used to estimate the shape of hidden objects.

Figure 6A:
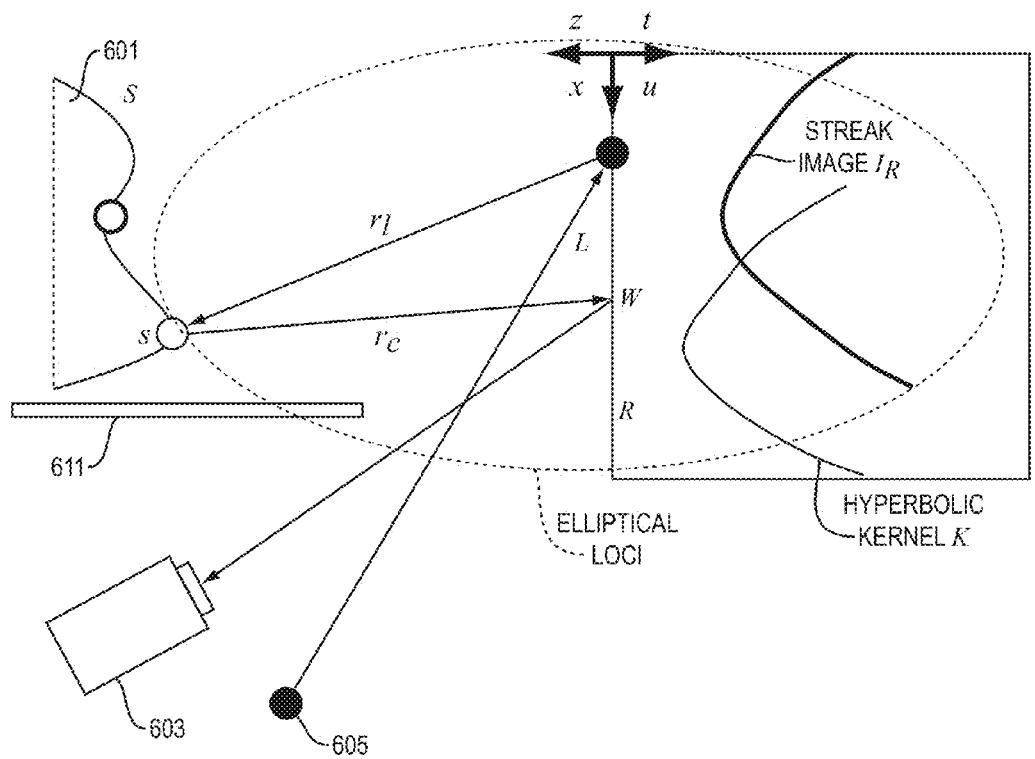
FIGS. 6A and 6B each show forward projection of light from a hidden object.
Figure 6B:
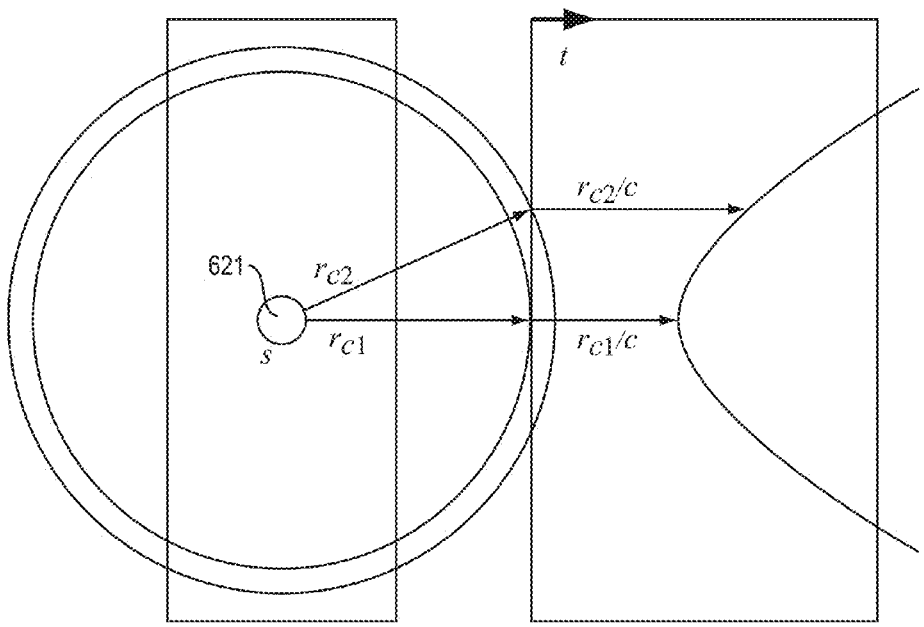

Consider the scene shown in FIGS. 6A and 6B. An occluder 611 hides the hidden object 601 from the direct line of sight of both the laser 605 and the streak camera 603. The scene also contains a diffuser wall R. A laser 605 emits a short light pulse and is pointed towards the diffuser wall R to form a laser spot L. The light reflected by the diffuser wall R reaches the hidden surface S, is reflected and returns back to the diffuser wall R. The streak camera 603 is also pointed towards the wall R.

In the example shown in FIGS. 6A and 6B, the laser 605 indirectly illuminates the surface S and each point s ∈ S generates a wavefront. The spherical wavefront contributes to a hyperbola in the space-time streak image, $I_R$. Spherical wavefronts propagating from a point create a hyperbolic space-time curve in the streak image.

For each location of the laser spot L, a 3D image (2 spatial and 1 temporal dimension) is recorded. The laser spot is moved to multiple locations on the wall (2D). The two dimensions for laser direction and the three dimensions for recording lead to a 5D light transport data. The pulse return time at each location on the wall depends upon several known parameters such as the location of the laser spot and unknown parameters such as the hidden surface profile.

According to principles of this invention, observed 5D light transport data may be used to infer the hidden surface profile. For an intuitive understanding, consider the hidden scene to be a single point 621, as shown in FIG. 6B. The reflected spherical wavefront propagating from that hidden scene point 621 reaches the different points on the wall at different times creating a hyperbolic curve in the space-time streak image (FIG. 7).

When the hidden scene contains a surface instead of individual and isolated scene points, the space-time hyperbolas corresponding to the different surface points are added together to produce the captured streak images; it is preferable to demultiplex or deconvolve these signals.

In general, this invention may use a captured 5D light transport data. However, a prototype of this invention used a streak camera that has one spatial dimension. Thus, this prototype captures only a four dimensional light transport. While the information from a 1D streak camera is sufficient for 3D reconstruction the spatial resolution in the axis perpendicular to the sensor axis is compromised.

Figure 7A:
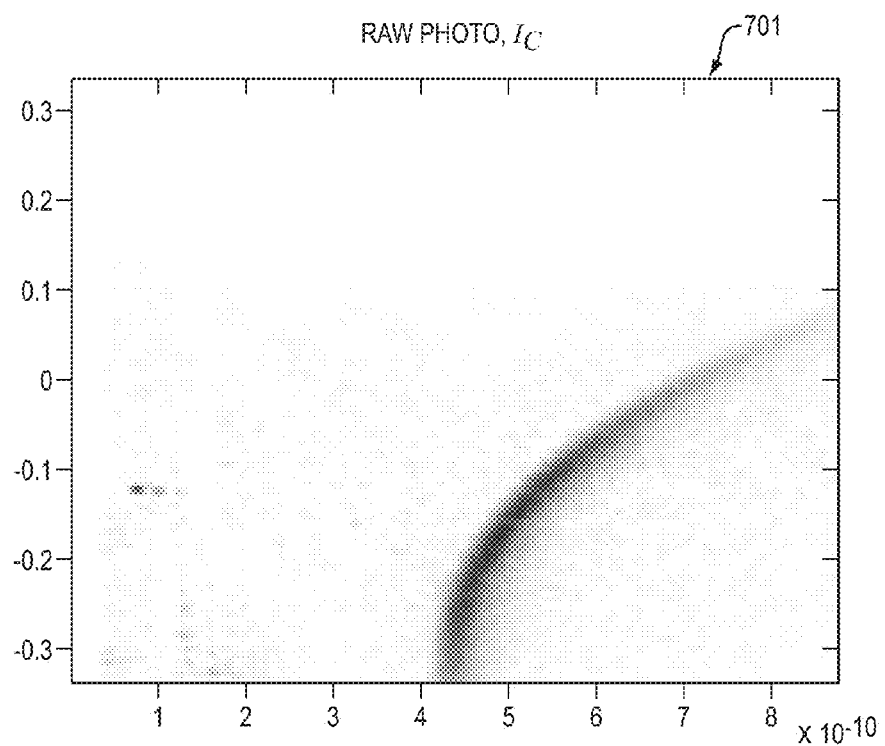
FIGS. 7A to 7D shows an example of a space time transform of a raw streak photo of a hidden object.
Figure 7B:
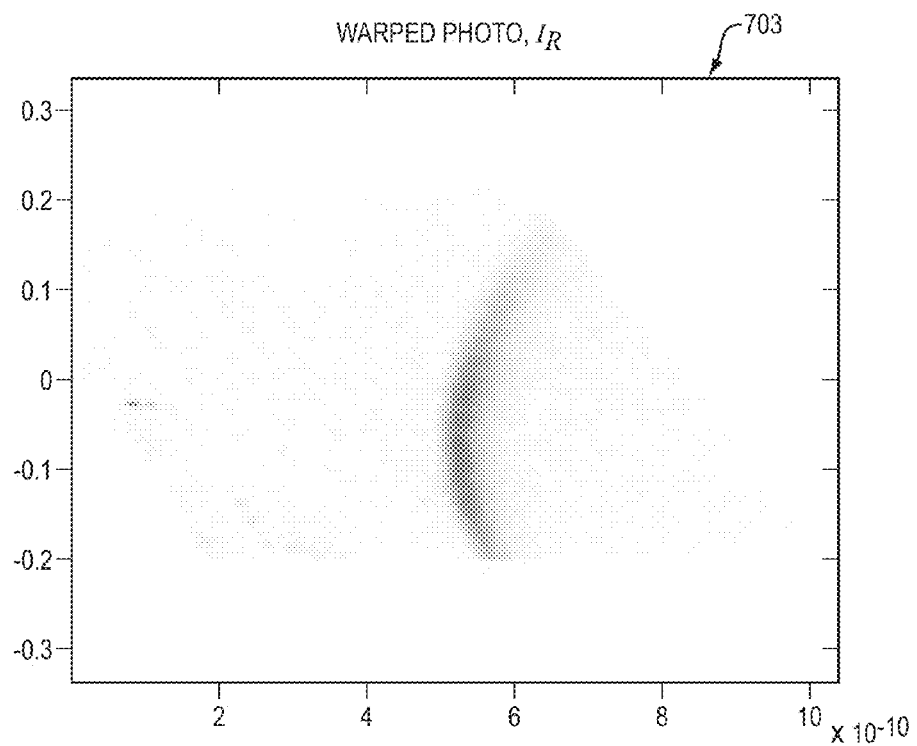
Figure 7C:
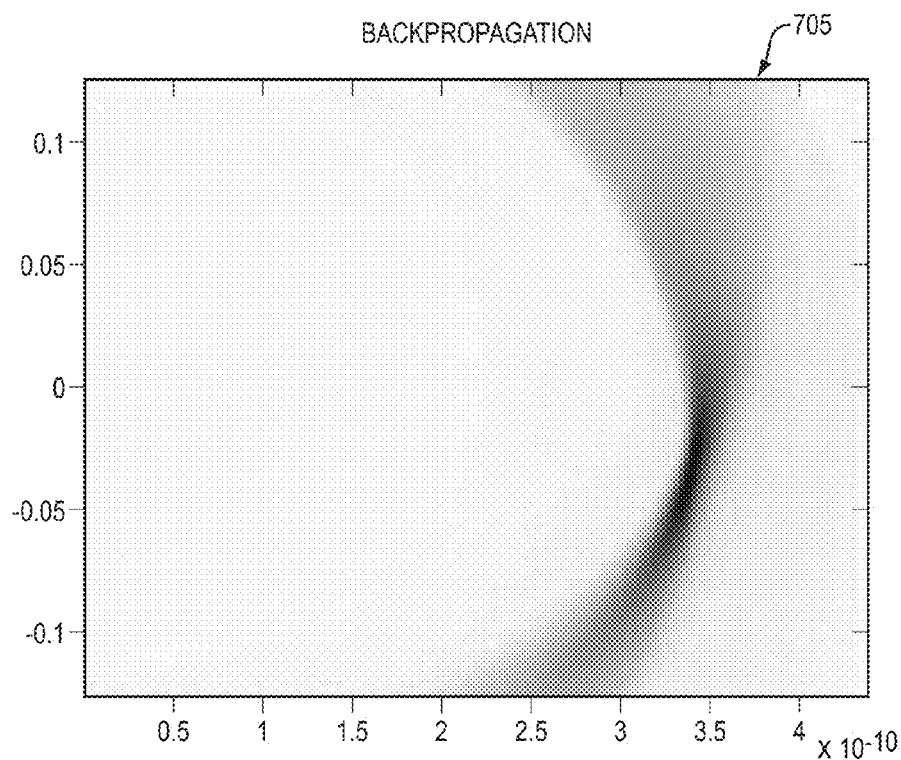
Figure 7D:
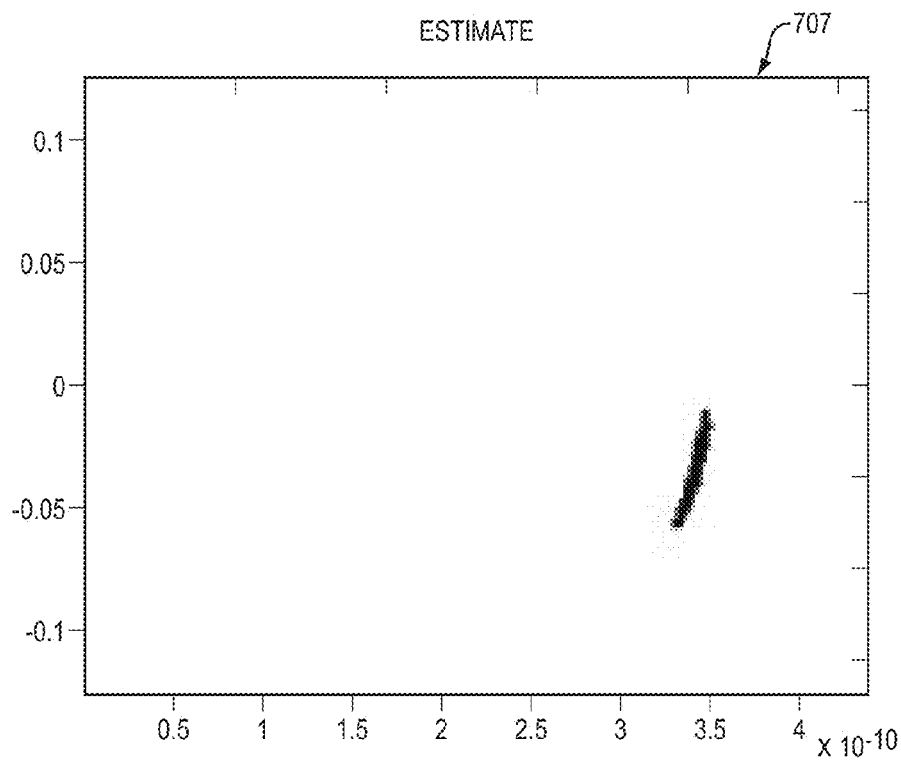

In the example shown in FIGS. 7A to 7D, a space time transform of a raw streak photo 701 (FIG. 7A) allows a segment problem to be converted into a sequence of two segment problems. The hidden object is a 1 cm×1 cm patch, which appears as a prominent blurred hyperbola in a warped photo 703 (FIG. 7B). Backpropagation creates a low frequency residual 705 (FIG. 7C), but simple thresholding results in an estimated image 707 that recovers the patch geometry (FIG. 7D).

In a prototype setup, the optical path for light travel consists of 4 segments (FIG. 6A): (1) from the laser 605 to the spot on the wall L, (2) from L to the scene point s, (3) from s again to a point on the wall w, and (4) finally from w to the camera 603 where it is recorded.

However, the first and the fourth segment are directed segments and do not involve diffuse scattering. This allows these segments to be precalibrated, effectively reducing the tertiary scattering problem to a primary (single) scattering problem.

More concretely, suppose the camera records the streak image $I_C(p,t)$, where p is the pixel coordinate and t is time. In $I_C$, t=0 corresponds to the instant the laser pulse is emitted from B, where B is the laser 605.

Then $I_C$ is related to the intensity $I_R(w,t)$ of light incident on the receiver plane by the transformation $$I_R(w,t) = I_C(H(w), t - \|L-B\| - \|C-w\|) \qquad \text{(Eq. 1)}$$

Here H is the projective transformation (homography) mapping coordinates on R to camera coordinates. $\|L-B\|$ is the absolute value of the time shift by distance from B to L. The absolute value of the time shift by the distance from camera to screen, $\|C-w\|$, varies hyperbolically with the pixel coordinate w. Since the geometry of wall, R, is known, H, $\|L-B\|$ and $\|C-w\|$ can be computed in advance. Note there is no $\cos(\theta)$ factor or $1/r^2$ fall off in the above formula as the camera integrates over more pixels for oblique and distant patches. For this to hold, it is also important that R is Lambertian, as is assumed.

Thus, the processing step (Equation 1) can reduce the problem to a single scattering problem, with an unfocused point source at L emitting a pulse at t=0 and an unfocused virtual array of receivers on R recording the intensity of the reflected wavefront, $I_R(w,t)$.

Now consider a simplified scenario (after the homography correction), of just two surfaces, the wall R and the hidden surface S. The surface S is illuminated by a light source at L. The surface R (receivers) can be assumed to host a virtual array of ultrafast photodetectors. The virtual photodetectors create an image $I_R(w,t)$ as intensity pattern of the incoming light as a function of time, t, and the position w. Hence the image, $I_R(w,t)$, is the intensity observed at w∈R at time t. In a prototype of this invention, the virtual photodetectors are realized by using a Lambertian object R observed by a streak camera with ps time resolution (FIGS. 6A and 6B).

Ignoring occlusions, the intensity pattern at R takes the following approximate form $$I_R(w,t) = \int_S \int_\tau \frac{1}{\pi r_c^2} \delta(r_c - t + \tau) I_S(s, \tau) d\tau d^2 s \qquad \text{(Eq. 2)}$$

where W∈R, S∈S, t, τ∈ℝ and $r_c = \|w-s\|$. Furthermore, $I_S(s,\tau)$ encodes the hidden 3D shape S as the intensity of the light emitted by the transmitter at s∈S at time τ. Note that units in which the speed of light c=1 are used. In other words, time is measured in units of distance. Note also that an approximation is made, by neglecting the dependence on the normals to surfaces R and S. In the situation of interest, the object S is a diffuse (Lambertian) object illuminated by a single point source at position L∈ℝ³. Concretely, this point source is the surface patch the laser is directed to. Hence, neglecting the normal dependence, $I_S(s,\tau) = I\delta(\tau - r_1)/(\pi r_l^2)$ with $r_l = \|L-s\|$.

Equation 2 becomes

Equation 2 becomes $$I_R(w,t) = \int_S I \frac{1}{\pi r_c^2} \frac{1}{\pi r_l^2} \delta(t - r_c - r_l) d^2 s \qquad \text{(Eq. 3)}$$

The propagation of laser to wall and wall to camera is ignored in $I_R$. Laser to wall propagation is corrected using an offset value for time. The wall to camera sensor propagation is inverted by using a homography. In summary, the recorded streak image, $I_C$, which involves three or more bounces is converted to image, $I_R$, which involves only one bounce. For simplicity, the remainder of this discussion (or modeling f light propagation) ignores $I_C$ and consider $I_R$ as the streak image.

For a fixed laser position, L, and sensor location, w, at a time t, the allowed values of s all lie on an ellipsoid with focal points L and w, given by the equation $t = r_c \pm r_l$. (More specifically, the locus of s lies on a prolate spheroid, i.e., an ellipsoid with two equal equatorial radii, smaller than the third equatorial radius.)

If L and s are fixed, this equation describes a two sheeted hyperboloid in (w,t)-space:

$$t - r_l = r_c = \sqrt{(x-u)^2 + (y-v)^2 + z(x,y)^2} \qquad \text{(Eq. 4)}$$

where (u,v) are the two coordinates of w in the plane of the receiver wall. In particular, each point on the hidden surface S will contribute a hyperboloid to the image $I_R(u,v,t)$. The hyperboloids will have different shapes, depending on the depth $z(x,y)$, and will be shifted along the t-axis. Smaller depth $z(x,y)$ increases eccentricity and leads to higher curvature at the vertex of the hyperboloid.

Suppose that the hidden surface S has a small depth variation. The depth variation can be described by $z(x,y)=z_0+\Delta z(x,y)$, with approximate mean depth $z_0$ and minor variations $\Delta z(x,y)$. Hence, $\Delta z(x,y) \ll z_0$. In this case, apply an additional approximation, which is the analog of the Fresnel approximation in Fourier optics. Note that this scenario involves incoherent and pulsed light, so the approximation may be called the modified Fresnel approximation.

Expand the square root in Equation 4 and assume that $z_0 \gg (x-u)$ or $(y-v)$. The right hand side of Equation 4 becomes $$r_c = \sqrt{(x-u)^2+(y-v)^2+z_0^2} + \Delta z(x,y), \text{ or } r_c = r_0 + \Delta z(x,y).$$

Using this approximation in the argument of the delta function in Equation 3, and neglecting $\Delta z$ in the denominator, $I_R$ can be expressed as a convolution.

$$I_R(u,v,t) \approx \int_{x,y} \frac{\delta(t-r_l-\Delta z-r_0)}{\pi^2 2 r_c^2 r_l^2} dx dy \quad \text{(Eq. 5)}$$

$$= \int_{x,y,\tau} \frac{\delta(t-\tau-r_0)\%(x-u)^2 + (y-v)^2 + z_0^2(\tau-r_l-\Delta z)}{\pi^2 2 r_c^2 r_l^2} dx dy d\tau$$

$$= (K * I_{SW})(u,v,t) \quad \text{(EQ. 6)}$$

Figure 8:
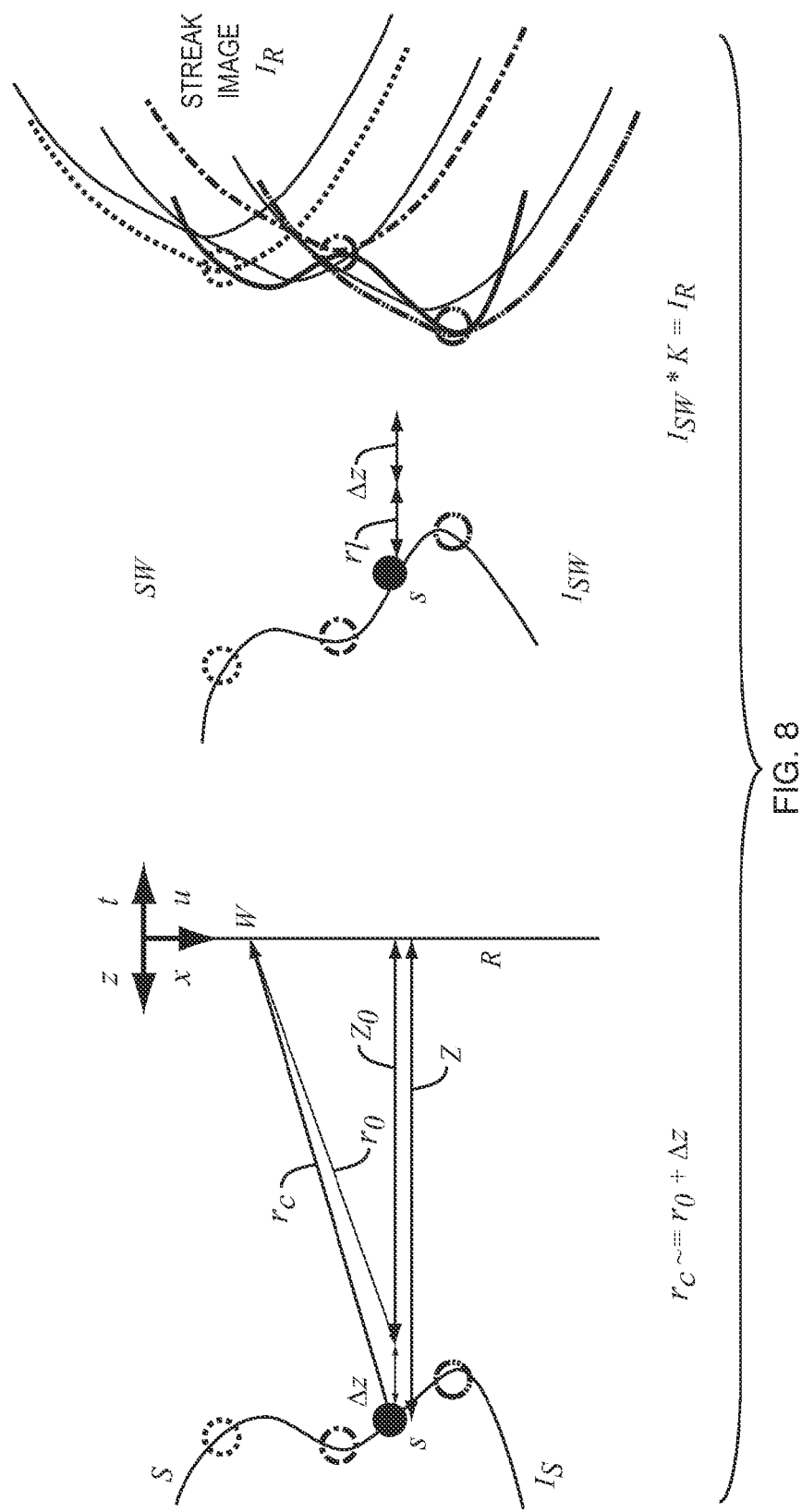
FIG. 8 shows a Fresnel approximation for convolution operation.

The hidden shape S is expressed using a delta function $I_S=\Delta z(x,y)$. As shown in FIG. 8, after a transform due to laser position, L, a new warped shape approximation can be written $I_{SW}(x,y,\tau)=\delta(\tau-r_l-\Delta z(x,y))/(\pi r_l^2)$. The delta function inside the integral in the expression immediately above Equation 6 can be split and the equation rewritten (see Equation 6) as a convolution (in 3-dimensional (u,v,t)-space) of the warped shape approximation $I_{SW}$. This warped image $I_{SW}$ "cramps up" information about the shape S in the time domain, warped by the additional "deformation" $r_l$, given by the distance to the laser. Finally the convolution kernel $K(x,y,t)=\delta(t-r_k)/(\pi r_k^2)$, with $r_k=\sqrt{x^2+y^2+z_0^2}$, is a hyperboloid, whose eccentricity (or curvature at the vertex) depends on $z_0$. Note that Equation 6 is highly nonlinear in the unknown depths $\Delta z$, but linear in the warped shape $I_{SW}$, from which these depths can be determined.

Thus, using the modified Fresnel approximation, for every depth, forward propagation can be expressed as a convolution with a hyperboloid. But for each depth, $z_0$, the curvature and position of the hyperboloid in space-time streak image, $I_R$, is progressively different.

FIG. 8 shows a Fresnel approximation for convolution operation. With a near-constant depth assumption of $\Delta z \ll z_0$, the streak image $I_R$ is a convolution of the warped shape contour image $I_{SW}$ with the hyperbolically shaped kernel K. The warped shape image in turn is the true shape (S), deformed along the z direction according to laser distance. Assuming an opaque object, the contributions are only from the points on the curve (surface) and not from the area behind the curve.

Algorithms for Surface Reconstruction:

The above results can be expressed using linear algebra. Discretize the bounding box around the hidden shape and the corresponding 3D Cartesian space into voxels and arrange the voxels into a vector $f_S \in \mathbb{R}^N$. Here N is the number of voxels in the 3D volume of interest. The value of $f_S(i)$ is set to zero for all the voxels that do not contain a surface point $s \in S$. The value of $f_S(i)$ for voxels that lie on the surface of the objects is the albedo (or reflectance) of the corresponding surface point. Voxels that are interior to the object are occluded by voxels on the surface of the object and do not return any signal energy, so they are also set to zero. Consider now the streak image $I_R$ recorded with the laser at position $L_1$. Vectorize the streak image pixels into a single vector $g_{R,1} \in \mathbb{R}^M$, where M is the total number of spatio-temporal pixels present.

The pixel values will depend linearly on the albedos in $f_S$ and hence satisfy a linear equation of the form $$g_{R,1} = A_1 f_S \quad \text{(Eq. 7)}$$

for some M×N matrix $A_1$.

The entries of $A_1$ can be read off from Equations 1 and 2. If multiple streak images $1, \ldots, n$ are recorded corresponding to different locations of the laser, then those different streak images are stacked on top of each other in a vector y, which satisfies the linear equation $$g_R = \begin{bmatrix} g_{R,1} \\ g_{R,2} \\ \vdots \\ g_{R,n} \end{bmatrix} = \begin{bmatrix} A_1 \\ A_2 \\ \vdots \\ A_n \end{bmatrix} f_S = A f_S$$

A goal is to analyze and solve the above linear system. The Fresnel approximation of the last section gives an intuition. Using the Fresnel approximation, the linear system can be rewritten as $g_R = A_F f_{SW}$, where $A_F$ is a block circulant matrix that represents the convolution with the hyperbolic kernel K.

Each voxel in the 3D world contributes signal energy to only a very small subset of the spatio-temporal bins (streak camera pixels) that are imaged. The specific spatio-temporal bins or pixels that contain signal energy are related to the hidden 3D surface. Further, if a particular pixel in the image contains no signal energy, this means that every voxel in the 3D world that would have contributed energy to it was empty. Both these pieces of information can be used to construct an algorithm for reconstruction. The basic intuition behind this algorithm (a backprojection algorithm) is as follows: Each observed pixel contributes energy back to all the source voxels that could have contributed energy to this pixel and the contribution made is proportional to the observed signal energy. Voxels in the world that were occupied receive contributions from all the pixels in the streak image that they contributed to and therefore have a large response. This response energy with appropriate filtering and thresholding can be used to recover the 3D surface. If the working volume is shallow (i.e., can be represented with a plane at depth $z_0$ plus minor depth variations), a single kernel of Fresnel approximation can be used, leading to a block circulant matrix A.

In order to implement the backpropagation algorithm, in practice, it is preferable to model the forward propagation of the spherical wavefronts from each of the hidden surface voxels.

First, consider the Fresnel approximation based forward propagation model described above. Under the Fresnel approximation the captured streak images can be written as a convolution of the unknown surface with the hyperbolic blur kernel as given by $$I_R = K * I_{SW}$$

with $K(x,y,t) = \delta(t-\sqrt{x^2+y^2+z_0^2})/(\pi(x^2+y^2+z_0^2))$. The backprojection kernel, on the other hand, is $\tilde{K}(x,t) = \delta(t+\sqrt{x^2+y^2+z_0^2})$.

Hence, using the Fresnel approximation, backprojection is, up to the distance attenuation prefactor, the adjoint of propagation. The effect of backprojection on the captured streak images can be described as a convolution with the point spread function psf=$\tilde{K}*K$. The function psf can be computed analytically. This function has a large peak at the center, surrounded by a butterfly shaped low frequency component. This peak implies that when backprojection is performed, peaks will be observed at all the locations where there is a 3D scene point. The limitations of backprojection are also evident from the function psf. Since the peak is surrounded by low frequency components, this approach without any post-processing (filtering) will lead to overly smoothened results. Rephrasing these observations in the matrix notation introduced above, the backprojection operation can be described by the matrix $\tilde{A}_F$, which is the same as $A_F^T$, up to the distance attenuation factors. The composition of propagation and backprojection $\tilde{A}_F A_F$, is close to the identity matrix.

While it is very useful to use the Fresnel approximation to analyze the effect of backprojection, the approximations made lead to inaccuracies when (a) the scene has significant depth variation or (b) there are occlusions. In those cases, it is preferable to use the more precise formulas set forth in Equations 2 and 3. Propagation can then no longer be written as a convolution, since the integral kernel, i.e., the hyperbola, changes shape with varying depth.

Figure 9:
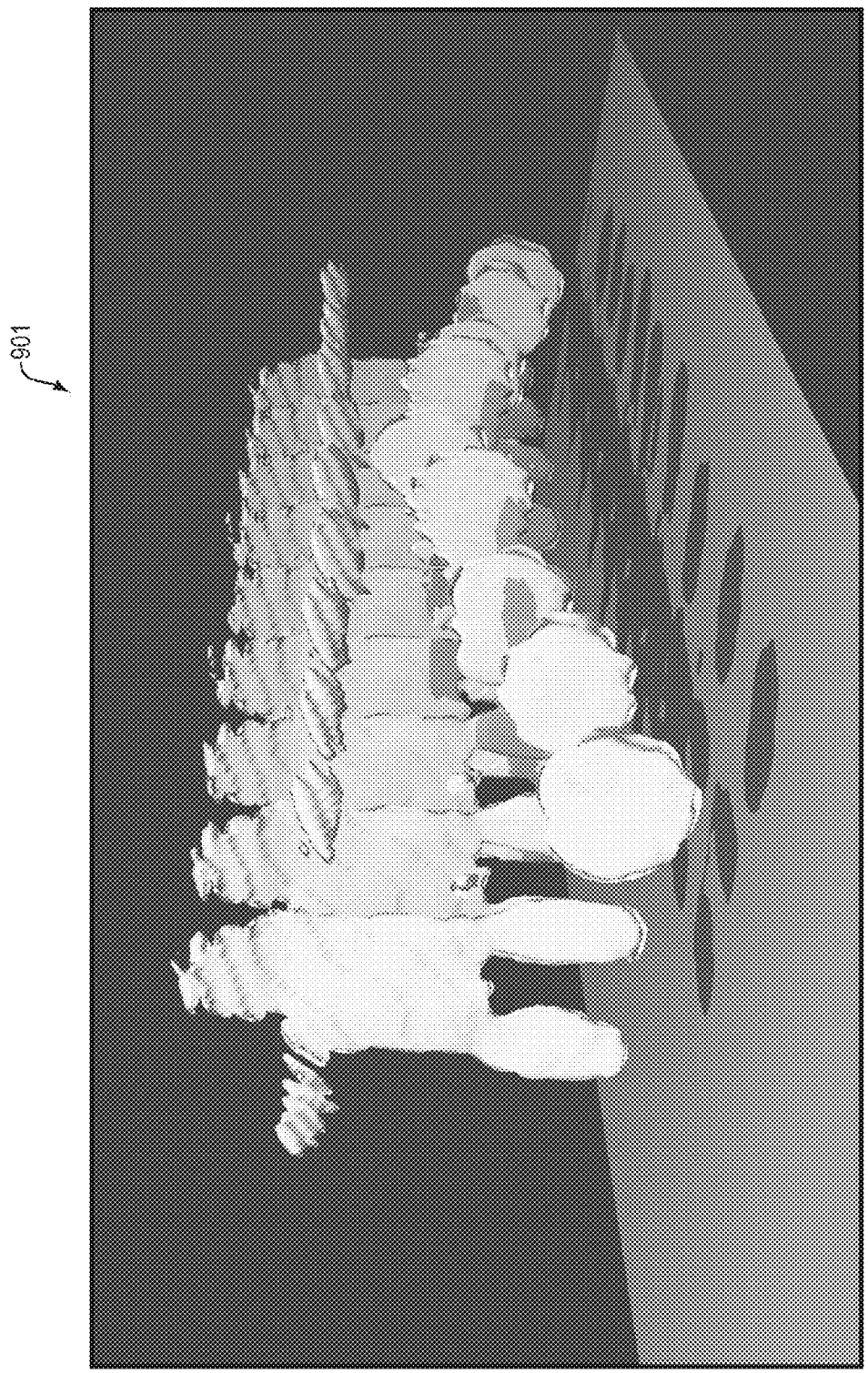
FIG. 9 shows a rendering of multi-pose stop-animation after backpropagation and soft thresholding. A hidden model of a man with a ball is captured in various poses.

FIG. 9 shows a rendering 901 of multi-pose stop-animation after backpropagation and soft thresholding. A hidden model of a man with a ball is captured in various poses. The rendering shows a sequence of reconstructions created by filtered backprojection algorithm and demonstrates the ability to remove low-frequency artifacts of backprojection. The mislabeled voxels remain consistent across different poses indicating stability of the capture and inversion process. Shadows are introduced to aid visualization.

Backprojection suffers from several limitations. The results of backprojection are smoother than the original surface and there are still a few false positive surface points. Surface slopes beyond 45 degrees are hard to reconstruct. This can be explained theoretically, at least in the Fresnel approximation as follows. The Fourier transform of the hyperbolic convolution kernel falls off gently (by a power law) in the direction orthogonal to the receiver plane, but falls off exponentially in the parallel direction. Hence features having high parallel spatial frequencies, such as high slope regions, are hard to recover. In order to tackle these limitations it is preferable to use additional prior information about the 3D scene being reconstructed.

In exemplary implementations of this invention, filtered backprojection may be employed. In filtered back projection, low frequency artifacts are removed around sharp features using a high pass filter. For example, a second derivative in the z direction of the voxel grid may be used. FIG. 9 shows the results after such filtering and applying a soft threshold.

Backprojection is a voxel-based technique and does not take into account the surface-based properties like orientation or reflectance profile. Thus, the above backprojection method works well for nearly Lambertian surfaces, for which the recorded images do not depend strongly on the surface normals.

Ultrafast Imaging:

This section discusses some benefits of ultra-fast imaging, as compared to traditional photography.

Consider traditional photography. Even with a still camera, one can in principle detect the displacement of a small hidden area of a scene as shown in FIG. 10A, but the problem is ill-conditioned. To see this, consider for simplicity a near planar scene at depth $z_0$, illuminated homogeneously by a far away source. The intensity of light incident at a point r∈R that was emitted by a surface patch above r of size $\Delta x$ by $\Delta x$ is proportional to $I(\Delta x)^2/(z_0^2)$, where I is the total intensity received. Moving the patch by $\Delta z \ll z_0$ in depth, the contributed intensity will change by $\Delta I \propto I(\Delta x)^2 \Delta z/z_0^3$. Thus, $\Delta I/I \propto (\Delta x)^2 \Delta z/z_0^3$. Consider a typical scenario, with spatial resolutions ($\Delta x, \Delta z \approx 5$ mm, $z_0 \approx 20$ cm). In that scenario, the following intensity resolution is needed: $\Delta I/I \sim 3 \times 10^{-5}$. This means one has to distinguish intensities of 1 from 1.00003. This is not possible in practice with traditional photography. Note that the intensities received after tertiary scattering are already very small, so it is hard to obtain a good signal to noise ratio.

For an ordinary camera, two conditions make the problem ill-conditioned: The relative intensity contributed by an emitter changes only slightly ($\propto \Delta z/z_0$) and this small change is overwhelmed by the contribution of the background with area A, yielding the factor $(\Delta x/z_0)^2$.

However, by using a picosecond accurate high-speed light source and sensors, these two problems can be circumvented.

First, a change in patch position s means it contributes to a different pixel in the streak photo, provided $\Delta z/c > \Delta t$, where c=speed of light and $\Delta t$ is time resolution.

Second, unlike an ordinary sensor, not all patches on S contribute to a pixel (time bin) in a streak photo making the mixing easier to invert. The locus of points contributing to a fixed sensor and time-bin position, (u,t), lie on a ring with radius $d=\sqrt{(ct)^2-z_0^2}$ (FIG. 10). If the time bin has a width of $\Delta t \ll t$, the width of the ring is approximately $\Delta d = c^2 t \Delta t/d$. Hence the total area of the ring is $2\pi d \Delta d = 2\pi c^2 t \Delta t$. A goal is to detect changes in the intensity emitted by a patch of size $\Delta A = (\Delta x)^2$. Hence the change in total intensity is approximately $\Delta I/I = \Delta A/(2\pi d \Delta d) = (\Delta x)^2/(2\pi c^2 t \Delta t)$. Assume a common scenario where $\Delta x \approx 3c\Delta t$. Furthermore $ct \approx z_0$. Hence $\Delta I/I \approx 3\Delta x/(2\pi z_0)$. Thus the required intensity increment is linearly proportional to $\Delta x/z_0$, and not quadratically as before. In the case of ultra-fast imaging (on the picosecond scale), this ratio is a reasonable $\sim 10^{-2}$. This gives the guidance on time-resolution. In addition, the time resolution of the light source should not be worse than that of the sensor.

FIGS. 10A and 10B are diagrams that show a benefit of ultra-fast time imaging. As shown in FIG. 10A, in a still camera, the ability to discern displacement of a patch with area $(\Delta x)^2$ by a distance $\Delta z$ is limited by camera sensitivity. As shown in FIG. 10B, using time resolution, the ability to discern the same patch is improved and possible within practical camera sensitivity. The pixel (u,t) receives energy only from inside the ring. For simplicity, the diagrams in this document show the scene in flat-land and the surfaces are drawn as 2D curves.

Figure 11A:
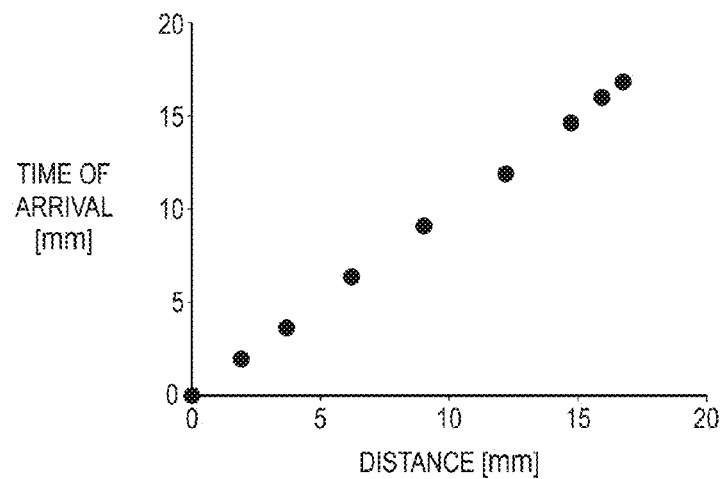
FIGS. 11A to 11C are charts regarding an exemplary image reconstructed by a prototype of this invention.
Figure 11B:
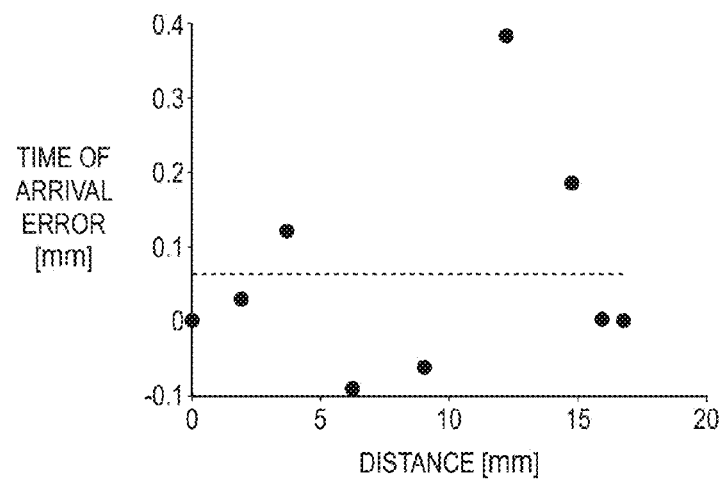
Figure 11C:
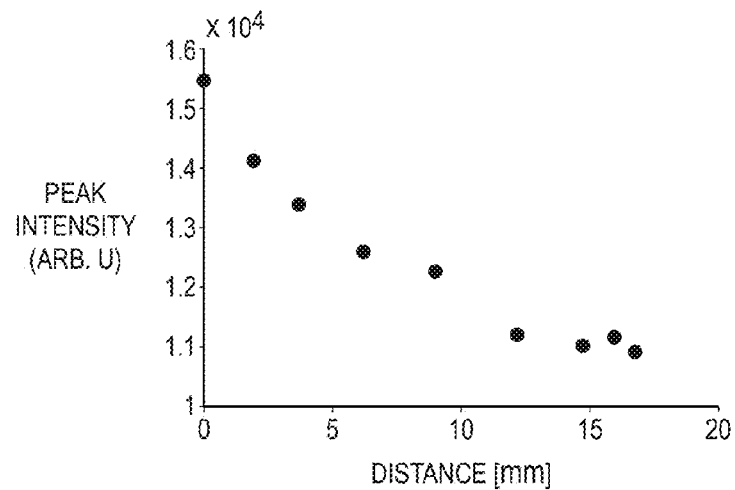

FIGS. 11A to 11C are charts regarding an exemplary image reconstructed by a prototype of this invention. FIG. 11A shows distance estimation. Time here is measured in mm of traveled distance at the speed of light 1~mm≈0.3 ps. FIG. 11B shows time of arrival error. Error is less than 1 mm. FIG. 11C shows a plot of intensity as a small patch is moved perpendicular to a surface.

Figure 12:
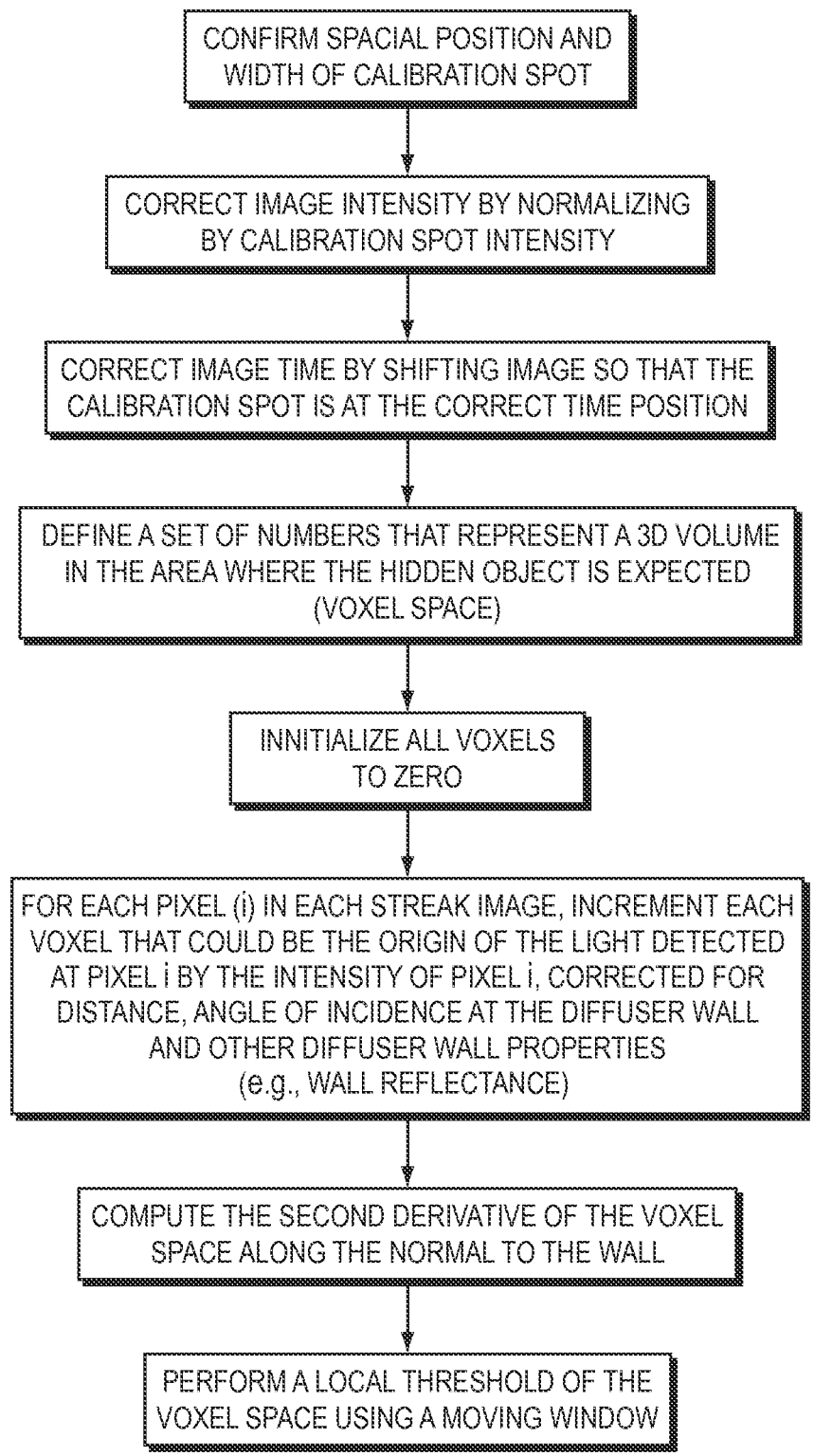
FIG. 12 is a high level flow chart of steps in reconstructing a 3D shape of a hidden object.

FIG. 12 is a high level flow chart of steps in reconstructing a 3D shape of a hidden object, in an illustrative implementation of the invention. These steps include: Confirm spatial position and width of calibration spot. Correct image intensity by normalizing by calibration spot intensity. Correct image time by shifting image so that the calibration spot is at the correct time position. Define a set of numbers that represent a 3D volume in the area where the hidden object is expected (voxel space). Initialize all voxels to zero. For each pixel i in each streak image, increment each voxel that could be the origin of the light detected at pixel i by the intensity of pixel i. Optionally, correct the increment for distance, angle of incidence at the diffuser wall and other diffuser wall properties (e.g., wall reflectance). Compute the second derivative of the voxel space along the normal to the wall. Perform a local threshold of the voxel space using a moving window.

In exemplary implementations of this invention, there are four important parameters for shape estimation: (1) the spatial resolution, i.e., the spacing between sensor pixels; (2) the temporal resolution of sensors and the laser, (3) the intensity resolution and signal to noise ratio of the sensors (and power of the light source) and (4) the angular diversity determined by the geometry of the setup.

As discussed above, time resolution can be important and can give an approximate lower bound on the resolution of the 3D reconstruction. This is the same as in the case of a direct view traditional time of flight camera. However, the present invention differs from a direct view time of flight camera. In exemplary implementations of this invention, neither the sensors nor the light source have any directional resolution into the hidden space after a diffuse reflection.

The position of a hidden point s is determined with highest confidence along the normal N to an ellipsoid through s with foci at the laser spot, L, and the wall point, w. A wide range of angles for N for all such pairs to create baselines is important. Note also that N is the angle bisector of ∠Lsw.

In exemplary implementations of this invention, there is the sufficiently high spatial resolution to be able to local structure in streak images to recover shape, despite two challenges (1) loss of correspondence (i.e., which part of the received signal at a sensor was emitted by which surface patch is not known), and (2) time resolution is finite.

Source Code and Processor:

Source Code used in a prototype of this invention is attached. Backproject_Clean.txt calls backproject_multiple_fast.txt—which performs the backprojection, and then applies a second derivative. Part of backproject_multiple_fast is implemented in C++ in a separate file (backproject_fast.txt).

In exemplary implementations of this invention, one or more processors are configured for, among other things: (1) outputting control signals to control the pulse source (e.g., laser), sensor (e.g., streak camera), apparatus for steering the pulses (e.g., galvanometer actuated mirrors) and other components of the imaging system, (2) receiving and analyzing input, including sensor data and user input, and (3) performing computations and algorithms (including the algorithms discussed above and below), executing software (including the software encoded in the Source Code). For example, processor 121 in FIG. 1 comprises one or more processors. Each of the one or more processors may be located in, adjacent to or remote from the other components of the imaging system (e.g., other processors, a streak camera or a laser) and may be connected by wire or wirelessly with such other components.

Applications

This invention has many applications. For example, in exemplary implementations, this invention may be used for: (1) sensing in hazardous environments such as inside machinery with moving parts; (2) monitoring contaminated areas such as the sites of chemical or radioactive leaks, e.g., where robots cannot operate or need to be discarded after use; (3) disaster response and search and rescue planning, or (4) autonomous robot navigation. In these applications, the ability to obtain information to look around the corner to obtain information about the scene is highly beneficial.

Variations:

This invention may be implemented in many different ways. Here are some non-limiting examples.

In some implementations of this invention, one or more of the following techniques may be used, in combination with the methods described above: (1) inference and inversion techniques that exploit scene priors, sparsity, rank, meaningful transforms and achieve bounded approximations; (2) adaptive sampling to decide the next-best laser direction based on a current estimate of the 3D shape; (3) coded sampling using compressive techniques, (4) noise models for SNR; (5) modulation of light to shape or focus pulses in space and time inside a scattering medium; and (6) exploiting the spatial frequency domain properties of direct and global components of scattered light in free space, in order to recover images of objects behind a diffuse screen.

This invention is not limited to any particular wave frequency, pulse duration, or duration of interval between onsets of successive pulses. For example, in the case of electromagnetic radiation, this invention is not limited to visible light, but may use electromagnetic radiation of any frequency, including frequencies approximately in the millimeter, terrahertz, visible, or radar range of frequencies.

This invention is not limited to electromagnetic radiation, but may use any type of wave. For example, the wave may comprise a mechanical wave, including sound. For example, the wave may include sound that is infrasonic (i.e., less than 20 Hz) or ultrasonic (i.e., greater than 20 kilohertz).

This invention may be implemented as a method of estimating a 3D surface of an object using a pulse source, a sensor and a processor, wherein: (a) the pulse source emits wave pulses that travel to the object, reflect off of the object, and then travel from the object to the sensor by one or more diffuse reflections; (b) an occluder prevents the wave pulses from traveling in a direct line from the object to the sensor; (c) each respective wave pulse has a direction immediately before the wave pulse first diffusely reflects after being emitted by the pulse source; (d) the direction of the respective wave pulses varies from wave pulse to wave pulse; (e) the sensor captures streak images while the wave pulses arrive at the sensor after the one or more diffuse reflections; and (f) the processor uses an algorithm to estimate the 3D surface. Furthermore: (1) the wave pulses may comprise electromagnetic radiation; (2) the pulse source may comprise a laser; (3) each wave pulse may have a duration, from beginning of pulse to end of pulse, that is less than or equal to one nanosecond; (4) the wave pulses may comprise mechanical waves; the wave pulses may comprise sound waves; (5) the algorithm may include: (a) determining a voxel space, (b) initializing each voxel in the voxel space to zero or to a reference value, (c) for each respective pixel of the sensor for each of the respective streak images, incrementing each voxel that could be an origin of measured intensity at the respective pixel, the increment being calculated based at least in part on measured intensity at the respective pixel, and (d) computing a second derivative of the voxel space along a normal to surface R; (6) the algorithm may include a step of performing a local threshold of the voxel space; (7) each of the wave pulses may undergo a last diffuse reflection, out of the one or more diffusion reflections, before reaching the sensor; the last diffuse reflection may be from a diffusely reflecting surface R; the pulse source may be a laser; the algorithm may include calibration using a calibration spot that appears in streak images captured by the sensor; and the calibration spot may be created by portion of light, initially from the laser, traveling to the surface R and from the surface R to the sensor; (8) the calibration may include correcting image intensity by normalizing based at least in part on calibration spot intensity; and (9) the calibration may include correcting image time so that the calibration spot is at a correct time position.

This invention may be implemented as a method of estimating a 3D surface of an object using a pulse source, a sensor and a processor, wherein: (a) the pulse source emits wave pulses that travel to the object, reflect off of the object, and then travel from the object to the sensor by one or more diffuse reflections; (b) an occluder prevents the wave pulses from traveling in a direct line from the object to the sensor; (c) each respective wave pulse has a direction immediately before the wave pulse first diffusely reflects after being emitted by the pulse source; (d) the direction of the respective wave pulses varies from wave pulse to wave pulse; (e) the sensor captures streak images while the wave pulses arrive at the sensor after the one or more diffuse reflections; (f) the processor uses an algorithm to estimate the 3D surface; and (g) the algorithm includes: (I) determining a voxel space; (II) initializing each voxel in the voxel space to zero or to a reference value; (III) for each respective pixel of the sensor for each of the respective streak images, incrementing each voxel that could have contributed to measured intensity at the respective pixel, the increment being calculated based at least in part on measured intensity at the respective pixel, and (IV) filtering the voxel space. Furthermore: (1) the wave pulses may comprise electromagnetic radiation; (2) the pulse source may comprise a laser; (3) each wave pulse may have a duration, from beginning of pulse to end of pulse, that is less than or equal to one nanosecond; (4) the filtering may comprise taking a second derivative of the summation; and (5) the filtering may comprise applying a threshold. (6) Each of the wave pulses may undergo a last diffuse reflection, out of the one or more diffusion reflections, before reaching the sensor; the last diffuse reflection may be from a diffusely reflecting surface R; and the algorithm may include a step of converting coordinates of the pixels into coordinates of points on the surface R. (7) After leaving the pulse source, each of the respective wave pulses may first diffusely reflect from a point L; each of the wave pulses may undergo a last diffuse reflection, out of the one or more diffusion reflections, before reaching the sensor; the last diffuse reflection may be from a point w on a diffusely reflecting surface R; and the algorithm may include a step in which allowed values of s are computed and the computed values of s, for a time t for a fixed L and a fixed w all lie on an ellipsoid with focal points L and w, given by the equation $t=r_c+r_l$ where S is the 3D surface, s is a point on the surface S, $r_c=\|w-s\|$, $r_l=\|L-s\|$, $\|w-s\|$ is absolute value of time shift by distance from w to s, and $\|L-s\|$ absolute value of time shift by distance from L to s. (8) Each of the wave pulses may undergo a last diffuse reflection, out of the one or more diffusion reflections, before reaching the sensor; the last diffuse reflection may be from a point w on a diffusely reflecting planar surface R; S may be the 3D surface; the processor may calculate points s on the surface S; and each of the calculated points s, respectively, may contribute a hyperboloid to $I_R(u,v,t)$, where (u,v) are coordinates of w in the plane of the surface R, t is time; and $I_R(u,v,t)$ is intensity of wave pulse at the surface R, as a function of u, v, and t.

DEFINITIONS AND CLARIFICATIONS

Here are a few definitions and clarifications. As used herein:

The terms "a" and "an", when modifying a noun, do not imply that only one of the noun exists.

The "direction" of a wave pulse, signal or radiation is the direction of maximum intensity of the wave pulse, signal or radiation.

The fact that an "example" or multiple examples of something are given does not imply that they are the only instances of that thing. An example (or a group of examples) is merely a non-exhaustive and non-limiting illustration.

The terms "include", "includes" and "including" shall be construed broadly, as if followed by "without limitation". The term "e.g." means including.

"Intensity" shall be construed broadly to include any measure of or related to intensity, energy or power. For example, the "intensity" of light includes any of the following measures: irradiance, spectral irradiance, radiant energy, radiant flux, spectral power, radiant intensity, spectral intensity, radiance, spectral radiance, radiant exitance, radiant emittance, spectral radiant exitance, spectral radiant emittance, radiosity, radiant exposure and radiant energy density. Also, for example, the "intensity" of sound includes sound pressure level, dB (sound pressure level), sound intensity, sound energy density, sound power, and acoustic power.

The term "light" is not limited to visible light, but includes electromagnetic radiation of any frequency. Similar terms, such as "illumination", "illuminate" and "shine", shall be construed broadly in the same manner. For example, an "illumination source" is a source of electromagnetic radiation.

An object is "non line of sight" or "NLOS" with respect to a camera if the object cannot be viewed directly (or by specular reflection) from the vantage point of the camera (including the camera's light source, if any, and light sensor).

The term "or" is an inclusive disjunctive. For example "A or B" is true if A is true, or B is true, or both A or B are true.

A parenthesis is simply to make text easier to read, by indicating a grouping of words. A parenthesis does not mean that the parenthetical material is optional or can be ignored.

The term "pixel" shall be broadly construed. A "pixel" includes (1) a pixel in a display device, (2) a sensel in a sensor, (3) a single sensor element of an array of sensors, such as in a charge-coupled device, and (4) the smallest subdivision of a sensor plane of a sensor, which subdivision can take a sensor measurement. The term "pixel" is not limited to the context of a sensor that measures light or another type of electromagnetism. For example, a sensor that measures sound (or other mechanical waves) may have pixels.

A "streak image" includes (1) an image captured by a streak camera, or (2) a set of data regarding time of arrival of, and intensity in a spatial dimension of, waves incident on a sensor.

A method of estimating a "3D surface" can estimate, among other things, a surface that has variation in all three Cartesian spatial coordinates.

Two values are "substantially" equal if they differ by less than 10%.

Two values differ "substantially" if they differ by 10% or more.

Two values differ by a certain percent, if $[(x-y)/x] \times 100$ equals that certain percent, where x is the larger of the two values and y is the smaller of the two values.

CONCLUSION

It is to be understood that the methods and apparatus which have been described above are merely illustrative applications of the principles of the invention. Numerous modifications may be made by those skilled in the art without departing from the scope of the invention. The scope of the invention is not to be limited except by the claims that follow.

What is claimed is:

1. A method of estimating a 3D surface of an object, wherein:
   (a) a pulse source emits wave pulses that travel to the object, reflect off of the object, and then travel from the object to a sensor by one or more diffuse reflections;
   (b) an occluder prevents the wave pulses from traveling in a direct line from the object to the sensor;
   (c) each respective wave pulse has a direction immediately before the wave pulse first diffusely reflects after being emitted by the pulse source;
   (d) the direction of the respective wave pulses varies from wave pulse to wave pulse;
   (e) the sensor captures streak images while the wave pulses arrive at the sensor after the one or more diffuse reflections;
   (f) a processor performs a calculation to estimate the 3D surface, wherein the calculation includes
      (i) calculating a voxel grid for a volume in which the object is located,
      (ii) for each respective voxel in a set of voxels in the voxel grid, initializing a variable associated with the respective voxel to zero or to a reference value, and
      (iii) for each respective pixel of the sensor for each of the respective streak images, incrementing the variable for each voxel that is a candidate, based on time of flight, of being an origin of measured intensity at the respective pixel, the increment being calculated based at least in part on measured intensity at the respective pixel; and
      (iv) calculating a second derivative to filter data that results from step (iii).

2. The method of claim 1, wherein the wave pulses comprise electromagnetic radiation.

3. The method of claim 2, wherein the pulse source comprises a laser.

4. The method of claim 3, wherein each wave pulse has a duration, from beginning of pulse to end of pulse, that is less than or equal to one nanosecond.

5. The method of claim 1, wherein the second derivative is taken along a direction in the voxel grid.

6. The method of claim 1, wherein the wave pulses comprise sound waves.

7. The method of claim 1, wherein the calculation to estimate the 3D surface includes a step of performing a local threshold.

8. The method of claim 1, wherein:
   (a) each of the wave pulses undergoes a last diffuse reflection, out of the one or more diffusion reflections, before reaching the sensor;
   (b) the last diffuse reflection is from a diffusely reflecting surface R;
   (c) the pulse source is a laser;
   (d) the calculation to estimate the 3D surface includes calibration using a calibration spot that appears in streak images captured by the sensor; and
   (e) the calibration spot is created by portion of light, initially from the laser, traveling to the surface R and from the surface R to the sensor.

9. The method of claim 8, wherein the calibration includes correcting image intensity by normalizing based at least in part on calibration spot intensity.

10. The method of claim 8, wherein the calibration includes correcting image time so that the calibration spot is at a correct time position.

11. A method of estimating a 3D surface of an object, wherein:
   (a) a pulse source emits wave pulses that travel to the object, reflect off of the object, and then travel from the object to a sensor by one or more diffuse reflections;
   (b) an occluder prevents the wave pulses from traveling in a direct line from the object to the sensor;
   (c) each respective wave pulse has a direction immediately before the wave pulse first diffusely reflects after being emitted by the pulse source;
   (d) the direction of the respective wave pulses varies from wave pulse to wave pulse;
   (e) the sensor captures streak images while the wave pulses arrive at the sensor after the one or more diffuse reflections;
   (f) a processor performs a calculation to estimate the 3D surface, wherein the calculation includes
      (i) calculating a voxel grid for a volume in which the object is located,
      (ii) for each respective voxel in a set of voxels in the voxel grid, initializing a variable associated with the respective voxel to zero or to a reference value,
      (iii) for each respective pixel of the sensor for each of the respective streak images, incrementing the variable for each voxel that is a candidate of being an origin of measured intensity at the respective pixel, the increment being calculated based at least in part on measured intensity at the respective pixel, and
      (iv) filtering data that results from step (iii).

12. The method of claim 11, wherein the wave pulses comprise electromagnetic radiation.

13. The method of claim 12, wherein the pulse source comprises a laser.

14. The method of claim 11, wherein each wave pulse has a duration, from beginning of pulse to end of pulse, that is less than or equal to one nanosecond.

15. The method of claim 11, wherein the filtering comprises taking a second derivative.

16. The method of claim 11, wherein the filtering comprises applying a threshold.

17. The method of claim 11, wherein:
   (a) each of the wave pulses undergoes a last diffuse reflection, out of the one or more diffusion reflections, before reaching the sensor;
   (b) the last diffuse reflection is from a diffusely reflecting surface R; and
   (c) the calculation to estimate the 3D surface includes a step of converting coordinates of the pixels into coordinates of points on the surface R.

18. The method of claim 11, wherein:
   (a) after leaving the pulse source, each of the respective wave pulses first diffusely reflects from a point L;
   (b) each of the wave pulses undergoes a last diffuse reflection, out of the one or more diffusion reflections, before reaching the sensor; the last diffuse reflection being from a point w on a diffusely reflecting surface R;
   (c) the calculation to estimate the 3D surface includes a step in which allowed values of s are computed and the computed values of s, for a time t for a fixed L and a fixed w, all lie on an ellipsoid with focal points L and w, given by the equation $t=r_c+r_l$, where S is the 3D surface, s is a point on the surface S, $r_c=\|w-s\|$, $r_l=\|L-s\|$, $\|w-s\|$ is absolute value of time shift by distance from w to s, and $\|L-s\|$ is absolute value of time shift by distance from L to s.

19. The method of claim 11, wherein:

each of the wave pulses undergo a last diffuse reflection, out of the one or more diffusion reflections, before reaching the sensor;

the last diffuse reflection is from a point w on a diffusely reflecting planar surface R;

S is the 3D surface;

the processor calculates points s on the surface S; and each of the calculated points s, respectively, contributes a hyperboloid to $I_R(u,v,t)$, where $(u,v)$ are coordinates of w in the plane of the surface R, t is time; and $I_R(u,v,t)$ is intensity of wave pulse at the surface R, as a function of u, v, and t.

20. An apparatus comprising, in combination:

(a) a pulse source configured to emit wave pulses that travel to an object, reflect off of the object, and then travel from the object to a sensor by one or more diffuse reflections, such that (i) each respective wave pulse has a direction immediately before the wave pulse first diffusely reflects after being emitted by the pulse source, and (ii) the direction of the respective wave pulses varies from wave pulse to wave pulse;

(b) the sensor, wherein the sensor is configured to capture streak images while the wave pulses arrive at the sensor after the one or more diffuse reflections; and (c) a processor for performing a calculation to estimate the 3D surface, wherein the calculation includes (i) calculating a voxel grid for a volume in which the object is located, (ii) for each respective voxel in a set of voxels in the voxel grid, initializing a variable associated with the respective voxel to zero or to a reference value, (iii) for each respective pixel of the sensor for each of the respective streak images, incrementing the variable for each voxel that is a candidate, based on time of flight, of being an origin of measured intensity at the respective pixel, the increment being calculated based at least in part on measured intensity at the respective pixel, and (iv) filtering data that results from step (iii).

\* \* \* \* \*